(12) United States Patent
Merritt

(10) Patent No.: US 12,192,410 B1
(45) Date of Patent: *Jan. 7, 2025

(54) SYSTEM AND METHOD FOR MANAGING ROUTING OF CUSTOMER CALLS TO AGENTS

(71) Applicant: MASSACHUSETTS MUTUAL LIFE INSURANCE COMPANY, Springfield, MA (US)

(72) Inventor: Sears Merritt, Groton, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/452,991

(22) Filed: Aug. 21, 2023

Related U.S. Application Data

(63) Continuation of application No. 17/991,800, filed on Nov. 21, 2022, now Pat. No. 11,736,617, which is a
(Continued)

(51) Int. Cl.
*H04M 3/51* (2006.01)
*G06N 5/022* (2023.01)
(Continued)

(52) U.S. Cl.
CPC ......... *H04M 3/5235* (2013.01); *G06N 5/022* (2013.01); *G06N 20/00* (2019.01);
(Continued)

(58) Field of Classification Search
None
See application file for complete search history.

(56) References Cited

U.S. PATENT DOCUMENTS 5,519,773 A 5/1996 Dumas et al.
6,185,558 B1 2/2001 Bowman et al.
(Continued)

FOREIGN PATENT DOCUMENTS

EP 2 109 302 B1 10/2009
EP 2 109 302 B2 9/2010
(Continued)

OTHER PUBLICATIONS

"Scikit-learn: machine learning in Python", GitHub, retrieved Aug. 27, 2021 from URL: https://github.com/scikit-learn/scikit-learn (5 pages).
(Continued)

*Primary Examiner* — Harry S Hong
(74) *Attorney, Agent, or Firm* — Foley & Lardner LLP

(57) ABSTRACT

A call management system of a call center retrieves from a customer database enterprise customer data associated with an identified customer in a customer call, which may include customer event data, attributions data, and activity event data. The customer database tracks prospects, leads, new business, and purchasers of an enterprise. The system retrieves customer demographic data associated with the identified customer. A predictive model is selected from a plurality of predictive models based on retrieved enterprise customer data. The selected predictive model, including a logistic regression model, and tree-based model, determines a value prediction signal for the identified customer, then classifies the identified customer into a first value group or a second value group. The system routes a customer call classified in the first value group to a first call queue assignment, and routes a customer call classified in the second value group to a second call queue assignment.

20 Claims, 14 Drawing Sheets

Related U.S. Application Data continuation of application No. 17/521,752, filed on Nov. 8, 2021, now Pat. No. 11,551,108, which is a continuation of application No. 17/107,571, filed on Nov. 30, 2020, now Pat. No. 11,176,461, which is a continuation-in-part of application No. 17/013,312, filed on Sep. 4, 2020, now Pat. No. 10,997,506, and a continuation-in-part of application No. 16/791,750, filed on Feb. 14, 2020, now Pat. No. 10,860,937, and a continuation-in-part of application No. 16/773,805, filed on Jan. 27, 2020, now Pat. No. 10,909,463, said application No. 17/013,312 is a continuation of application No. 16/739,967, filed on Jan. 10, 2020, now Pat. No. 10,769,538, said application No. 16/791,750 is a continuation of application No. 16/546,052, filed on Aug. 20, 2019, now Pat. No. 10,565,529, said application No. 16/773,805 is a continuation of application No. 16/541,046, filed on Aug. 14, 2019, now Pat. No. 10,547,748, said application No. 16/739,967 is a continuation of application No. 16/455,983, filed on Jun. 28, 2019, now Pat. No. 10,540,593, said application No. 16/546,052 is a continuation of application No. 16/283,378, filed on Feb. 22, 2019, now Pat. No. 10,395,184, said application No. 16/541,046 is a continuation of application No. 16/276,165, filed on Feb. 14, 2019, now Pat. No. 10,412,224, said application No. 16/455,983 is a continuation of application No. 16/267,331, filed on Feb. 4, 2019, now Pat. No. 10,346,750, said application No. 16/276,165 is a continuation of application No. 16/110,940, filed on Aug. 23, 2018, now Pat. No. 10,257,357, said application No. 16/283,378 is a continuation of application No. 16/110,872, filed on Aug. 23, 2018, now Pat. No. 10,229,370, said application No. 16/267,331 is a continuation of application No. 16/111,011, filed on Aug. 23, 2018, now Pat. No. 10,235,628.

(60) Provisional application No. 62/687,130, filed on Jun. 19, 2018, provisional application No. 62/648,330, filed on Mar. 26, 2018, provisional application No. 62/648,325, filed on Mar. 26, 2018, provisional application No. 62/551,690, filed on Aug. 29, 2017.

(51) Int. Cl.
| | |
|---|---|
| *G06N 20/00* | (2019.01) |
| *G06Q 30/0201* | (2023.01) |
| *G06Q 30/0282* | (2023.01) |
| *G06Q 30/0601* | (2023.01) |
| *H04M 3/436* | (2006.01) |
| *H04M 3/523* | (2006.01) |
| *H04M 3/42* | (2006.01) |

(52) U.S. Cl.
CPC ..... *G06Q 30/0201* (2013.01); *G06Q 30/0282* (2013.01); *G06Q 30/0601* (2013.01); *H04M 3/4365* (2013.01); *H04M 3/5232* (2013.01); *H04M 3/5233* (2013.01); *H04M 3/42059* (2013.01); *H04M 3/42195* (2013.01); *H04M 3/5183* (2013.01); *H04M 3/5231* (2013.01); *H04M 2203/556* (2013.01); *H04M 2203/558* (2013.01)

(56) References Cited

U.S. PATENT DOCUMENTS

| | | |
|---|---|---|
| 6,236,977 B1 | 5/2001 | Verba et al. |
| 6,611,590 B1 | 8/2003 | Lu et al. |
| 6,862,574 B1 | 3/2005 | Srikant et al. |
| 6,879,683 B1 | 4/2005 | Fain et al. |
| 6,970,554 B1 | 11/2005 | Peterson et al. |
| 6,975,720 B1 | 12/2005 | Crook |
| 7,023,979 B1 | 4/2006 | Wu et al. |
| 7,035,811 B2 | 4/2006 | Gorenstein |
| 7,047,206 B1 | 5/2006 | Schultze |
| 7,228,284 B1 | 6/2007 | Vaillancourt et al. |
| 7,275,083 B1 | 9/2007 | Seibel et al. |
| 7,340,410 B1 | 3/2008 | Vaillancourt et al. |
| 7,580,870 B1 | 8/2009 | Chang |
| 8,000,989 B1 | 8/2011 | Kiefhaber et al. |
| 8,155,297 B1 | 4/2012 | Dhir et al. |
| 8,311,863 B1 | 11/2012 | Kemp |
| 8,355,934 B2 | 1/2013 | Virdhagriswaran |
| 8,386,639 B1 | 2/2013 | Galvin |
| 8,515,736 B1 | 8/2013 | Duta |
| 8,548,843 B2 | 10/2013 | Folk et al. |
| 8,571,951 B2 | 10/2013 | Diana et al. |
| 8,577,014 B2 | 11/2013 | Brandt et al. |
| 8,582,750 B2 | 11/2013 | Lee et al. |
| 8,781,092 B2 | 7/2014 | Noble, Jr. |
| 8,805,734 B2 | 8/2014 | Diana et al. |
| 8,929,537 B2 | 1/2015 | Chishti et al. |
| 9,055,148 B2 | 6/2015 | Sri et al. |
| 9,077,804 B2 | 7/2015 | Kannan et al. |
| 9,160,851 B2 | 10/2015 | Kugler et al. |
| 9,263,038 B2 | 2/2016 | Flaks et al. |
| 9,582,786 B2 | 2/2017 | Gubin et al. |
| 9,635,181 B1 | 4/2017 | McGann et al. |
| 9,680,996 B2 | 6/2017 | Kumar et al. |
| 9,805,734 B2 | 10/2017 | Sugiyama |
| 9,911,131 B1 | 3/2018 | Ross et al. |
| 9,916,538 B2 | 3/2018 | Zadeh et al. |
| 10,229,370 B1 | 3/2019 | Merritt |
| 10,235,628 B1 | 3/2019 | Merritt |
| 10,257,355 B1 | 4/2019 | Merritt |
| 10,257,357 B1 | 4/2019 | Merritt |
| 10,346,750 B1 | 7/2019 | Merritt |
| 10,395,184 B1 | 8/2019 | Merritt |
| 10,402,723 B1 | 9/2019 | Silberman et al. |
| 10,412,224 B1 | 9/2019 | Merritt |
| 10,540,593 B1 | 1/2020 | Merritt |
| 10,547,748 B1 | 1/2020 | Merritt |
| 10,565,529 B1 | 2/2020 | Merritt |
| 10,582,060 B1 | 3/2020 | Merritt |
| 10,769,538 B1 | 9/2020 | Merritt |
| 10,909,463 B1 | 2/2021 | Merritt |
| 10,997,506 B1* | 5/2021 | Merritt .................. G06N 20/00 |
| 11,176,461 B1 | 11/2021 | Merritt |
| 11,551,108 B1 | 1/2023 | Merritt |
| 11,736,617 B1* | 8/2023 | Merritt ..................... G06N 7/01 379/266.02 |
| 2002/0035504 A1 | 3/2002 | Dver et al. |
| 2002/0082892 A1 | 6/2002 | Raffel et al. |
| 2002/0128885 A1 | 9/2002 | Evans |
| 2002/0138492 A1 | 9/2002 | Kil |
| 2002/0141561 A1 | 10/2002 | Duncan et al. |
| 2004/0081311 A1 | 4/2004 | Thompson |
| 2004/0143473 A1 | 7/2004 | Tivey et al. |
| 2004/0143476 A1 | 7/2004 | Kapadia et al. |
| 2004/0143482 A1 | 7/2004 | Tivey et al. |
| 2004/0143483 A1 | 7/2004 | Tivey et al. |
| 2004/0143484 A1 | 7/2004 | Kapadia et al. |
| 2005/0108064 A1 | 5/2005 | Castleman et al. |
| 2005/0125334 A1 | 6/2005 | Masella et al. |
| 2005/0135593 A1 | 6/2005 | Becerra et al. |
| 2005/0195966 A1 | 9/2005 | Adar et al. |
| 2006/0041500 A1 | 2/2006 | Diana et al. |
| 2006/0155642 A1 | 7/2006 | Pettersen |
| 2006/0200360 A1 | 9/2006 | Razletovskiy |
| 2006/0229896 A1 | 10/2006 | Rosen et al. |
| 2006/0265259 A1 | 11/2006 | Diana et al. |
| 2007/0027746 A1 | 2/2007 | Grabowich |
| 2007/0136164 A1 | 6/2007 | Roti et al. |
| 2007/0174108 A1 | 7/2007 | Monster |
| 2008/0120129 A1 | 5/2008 | Seubert et al. |
| 2008/0162258 A1 | 7/2008 | Kala et al. |
| 2008/0184270 A1 | 7/2008 | Cole et al. |

(56) References Cited

U.S. PATENT DOCUMENTS

| | | |
|---|---|---|
| 2008/0201204 A1 | 8/2008 | Rose et al. |
| 2008/0201205 A1 | 8/2008 | Rose et al. |
| 2008/0294501 A1 | 11/2008 | Rennich |
| 2009/0190744 A1 | 7/2009 | Xie et al. |
| 2009/0190745 A1 | 7/2009 | Xie et al. |
| 2009/0190749 A1 | 7/2009 | Xie et al. |
| 2009/0190750 A1 | 7/2009 | Xie et al. |
| 2009/0232294 A1 | 9/2009 | Xie et al. |
| 2009/0234710 A1 | 9/2009 | Belgaied Hassine et al. |
| 2010/0030578 A1 | 2/2010 | Siddique et al. |
| 2010/0054453 A1 | 3/2010 | Stewart |
| 2010/0114573 A1 | 5/2010 | Huang et al. |
| 2010/0306249 A1 | 12/2010 | Hill et al. |
| 2011/0153449 A1 | 6/2011 | Hite |
| 2011/0196776 A1 | 8/2011 | Rash et al. |
| 2011/0225082 A1 | 9/2011 | Diana et al. |
| 2011/0258016 A1 | 10/2011 | Barak et al. |
| 2011/0258067 A1 | 10/2011 | Rowell |
| 2011/0307257 A1 | 12/2011 | Pereg et al. |
| 2012/0053986 A1 | 3/2012 | Cardno et al. |
| 2012/0066065 A1 | 3/2012 | Switzer |
| 2012/0072232 A1 | 3/2012 | Frankham et al. |
| 2012/0166445 A1 | 6/2012 | Chakrabarti et al. |
| 2012/0203584 A1 | 8/2012 | Mishor et al. |
| 2013/0006916 A1 | 1/2013 | McBride et al. |
| 2013/0031081 A1 | 1/2013 | Vijayaraghavan et al. |
| 2013/0054480 A1 | 2/2013 | Ross et al. |
| 2013/0080362 A1 | 3/2013 | Chang et al. |
| 2013/0085805 A1 | 4/2013 | Krusar |
| 2013/0215116 A1 | 8/2013 | Siddique et al. |
| 2013/0218634 A1 | 8/2013 | Hills et al. |
| 2013/0236002 A1 | 9/2013 | Jennings et al. |
| 2013/0332204 A1 | 12/2013 | Fiori et al. |
| 2014/0025871 A1 | 1/2014 | Kanai |
| 2014/0058831 A1 | 2/2014 | Duva et al. |
| 2014/0149178 A1 | 5/2014 | Hedges |
| 2014/0149339 A1 | 5/2014 | Title et al. |
| 2014/0153703 A1 | 6/2014 | Desai et al. |
| 2014/0180974 A1 | 6/2014 | Kennel et al. |
| 2014/0201126 A1 | 7/2014 | Zadeh et al. |
| 2014/0229406 A1 | 8/2014 | Puzis et al. |
| 2014/0249872 A1 | 9/2014 | Stephan et al. |
| 2014/0257871 A1 | 9/2014 | Christensen et al. |
| 2014/0279722 A1 | 9/2014 | Singh et al. |
| 2014/0289005 A1 | 9/2014 | Laing et al. |
| 2014/0324529 A1 | 10/2014 | Bliss |
| 2015/0046219 A1 | 2/2015 | Shavlik |
| 2015/0154524 A1 | 6/2015 | Borodow et al. |
| 2015/0189088 A1 | 7/2015 | Surridge et al. |
| 2016/0036976 A1 | 2/2016 | Odinak et al. |
| 2016/0065735 A1 | 3/2016 | Pott et al. |
| 2016/0071117 A1 | 3/2016 | Duncan |
| 2016/0132892 A1 | 5/2016 | Zhou et al. |
| 2016/0203498 A1 | 7/2016 | Das et al. |
| 2016/0261742 A1 | 9/2016 | Offen et al. |
| 2016/0300252 A1 | 10/2016 | Frank et al. |
| 2016/0337795 A1 | 11/2016 | Nachman et al. |
| 2016/0352900 A1 | 12/2016 | Bell et al. |
| 2017/0124581 A1 | 5/2017 | Wilson et al. |
| 2017/0140313 A1 | 5/2017 | Nandi et al. |
| 2017/0140387 A1 | 5/2017 | Nandi et al. |
| 2017/0186018 A1 | 6/2017 | Nandi et al. |
| 2017/0214797 A1 | 7/2017 | Dhir et al. |
| 2017/0223190 A1 | 8/2017 | Mandel et al. |
| 2017/0243137 A1 | 8/2017 | Mandel et al. |
| 2019/0034963 A1 | 1/2019 | George et al. |
| 2019/0095785 A1 | 3/2019 | Sarkar et al. |
| 2020/0013068 A1 | 1/2020 | Pony et al. |

FOREIGN PATENT DOCUMENTS

| | | |
|---|---|---|
| WO | WO-2007/112411 A2 | 10/2007 |
| WO | WO-2009/065052 A1 | 5/2009 |

OTHER PUBLICATIONS

Barga, R., Fontama, V., Tok, W. H., & Cabrera-Cordon, L. (2015). Predictive analytics with Microsoft Azure machine learning (pp. 221-241 ). Berkely, CA: Apress. (Year: 2015).

Bernier, "Interactive Voice Response", Genesys, retrieved Oct. 3, 2017 from URL: http://www.genesys.com/solutions/customer-engagement/inbound/intelligent-voice-response (3 pages).

Bernier, "Speech & Text Analytics", Genesys, retrieved Oct. 3, 2017 from URL: http://genesis.com/solutions/employee-engagement/workforce-optimization/workforce-planning/speech-text-analytics (4 pages).

Cody et al., "The integration of business intelligence and knowledge management", IBM Systems Journal, vol. 41, No. 4, Jul. 12, 2002, pp. 697-713, retrieved from URL: https://pdfs.semanticscholar.org/3803/109409dd7822c6007d5c76808b8c28698e2cd.pdf (17 pages).

Costa, Sara, "Call Flow", Talkdesk Support, Jan. 18, 2018, retrieved May 11, 2018 from URL: https://support.talkdesk.com/hc/en-us/articles/206196766-Call-Flow (6 pages).

Florez-Lopez et al., "Marketing Segmentation Through Machine Learning Models: An Approach Based on Customer Relationship Management and Customer Profitability Accounting", Social Science Computer Review, Oct. 8, 2008, pp. 1-22, DOI: 10.1177/0894439308321592, retrieved from URL: https://pdfs.semanticscholar.org/ef05/502e936a94cafa0037c764bfb2212f385d97.pdf (22 pages).

Gayle, Sanford, "The Marriage of Market Basket Analysis to Predictive Modeling", 2000, pp. 1-6, retrieved from URL: http://ai.stanford.edu/~ronnyk/WEBKDD2000/papers/gayle.pdf (6 pages).

Golbeck, Jennifer Ann, "Computing and applying trust in web-based social networks", Dissertation, 2005 (199 pages).

Guestrin, Carlos, "Unsupervised learning or Clustering-K-means Gaussian mixture models", Apr. 4, 2007, retrieved from URL: http://www.cs.cmu.edu/-guestrin/Class/10701-S07/Slides/clustering.pdf (67 pages).

Jutla et al., "Enabling and Measuring Electronic Customer Relationship Management Readiness," Proceedings of the 34th Hawaii International Conference on System Sciences—2001; <http://www.computer.org/csdl/proceedings/nicss/2001 /0981 /07 /09817023.pdf>, Aug. 7, 2002, (10 pages).

Kim et al., "Customer Targeting: A Neural Network Approach Guided by Genetic Algorithms", Feb. 1, 2005, retrieved from URL: http://citeseerx.ist.psu.edu/viewdoc/download?doi=10.1.1.2.697&rep=rep1 &type=pdf (31 pages).

Lin et al., "Combining ranking concept and social network analysis to detect collusive groups in online auctions", Expert Systems with Applications, vol. 30, Issue 10, pp. 9079-9086 (8 pages).

Motta et al., "Forecasting in multi-skill call centers: A multi-agent multi-service (MAMS) approach: research in progress", 2013 Fifth International Conference on Service Science and Innovation {ICSSI), Oct. 24, 2013, retrieved from URL: http://ieeexplore.ieee.org/abstract/document/6599389/ (7 pages).

Python Home Page, retrieved Aug. 27, 2021 from URL: https://www.python.org/ (3 pages).

Shen et al., Forecasting Time Series of Inhomogenous Poisson Processes with Application to Call Center Workforce Management, The Annals of Applied Statistics, <https://www.unc.edu/-haipeng/publication/poissonSVD.pdf>, Jul. 25, 2008, (25 pages).

Stepanov et al, "Automatic Summarization of Call-center Conversations", Conference: IEEE Automatic Speech Recognition and Understanding Workshop (ASRU 2015), Dec. 2015, retrieved from URL: https://www.researchgate.net/publication/282976793_Automatic_Summarization_of_Call-center_Conversations (3 pages).

Wang et al., "Recommending trusted online auction sellers using social network analysis." Expert Systems with Applications 34.3, 2008, pp. 1666-1679 (14 pages).

Yang et al., "A Method for Web Service Discovery and Dynamic Composition Based on Service Chain", Germany, Springer Verlag, 2012, (2 pages).

(56) References Cited

OTHER PUBLICATIONS

Yankov et al., "Evaluation of Explore-Exploit Policies in Multi-result Ranking Systems", Apr. 28, 2015, retrieved from URL: https://arxiv.org/pdf/1504.07662.pdf (9 pages).

* cited by examiner

SYSTEM AND METHOD FOR MANAGING ROUTING OF CUSTOMER CALLS TO AGENTS

CROSS-REFERENCE TO RELATED APPLICATIONS

This application is a continuation of Ser. No. 17/991,800, entitled "SYSTEM AND METHOD FOR MANAGING ROUTING OF CUSTOMER CALLS TO AGENTS," filed Nov. 21, 2022, which is a continuation of U.S. patent application Ser. No. 17/521,752, entitled "SYSTEM AND METHOD FOR MANAGING ROUTING OF CUSTOMER CALLS TO AGENTS," filed Nov. 8, 2021, which is a continuation of U.S. patent application Ser. No. 17/107,571, entitled "SYSTEM AND METHOD FOR MANAGING ROUTING OF CUSTOMER CALLS TO AGENTS," filed Nov. 30, 2020, which is a continuation-in-part of U.S. patent application Ser. No. 16/773,805, entitled "SYSTEM AND METHOD FOR MANAGING ROUTING OF CUSTOMER CALLS TO AGENTS," filed Jan. 27, 2020, which is a continuation of U.S. patent application Ser. No. 16/541,046, entitled "SYSTEM AND METHOD FOR MANAGING ROUTING OF CUSTOMER CALLS TO AGENTS," filed Aug. 14, 2019, which is a continuation of U.S. patent application Ser. No. 16/276,165, entitled "SYSTEM AND METHOD FOR MANAGING ROUTING OF CUSTOMER CALLS TO AGENTS," filed Feb. 14, 2019, which is a continuation of U.S. patent application Ser. No. 16/110,940, entitled "SYSTEM AND METHOD FOR MANAGING ROUTING OF CUSTOMER CALLS TO AGENTS," filed Aug. 23, 2018, which claims the benefit of U.S. Provisional App. No. 62/551,690, filed Aug. 29, 2017, claims the benefit of U.S. Provisional App. No. 62/648,325, filed Mar. 26, 2018, claims the benefit of U.S. Provisional App. No. 62/648,330, filed Mar. 26, 2018, and claims the benefit of U.S. Provisional App. No. 62/687,130, filed Jun. 19, 2018, all of which are incorporated by reference in their entirety.

This application is a continuation of U.S. patent application Ser. No. 17/107,571, entitled "SYSTEM AND METHOD FOR MANAGING ROUTING OF CUSTOMER CALLS TO AGENTS," filed Nov. 30, 2020, which is also a continuation-in-part of U.S. patent application Ser. No. 16/791,750, entitled "SYSTEM AND METHOD FOR MANAGING ROUTING OF CUSTOMER CALLS TO AGENTS," filed Feb. 14, 2020, which is a continuation of U.S. patent application Ser. No. 16/546,052, entitled "SYSTEM AND METHOD FOR MANAGING ROUTING OF CUSTOMER CALLS TO AGENTS," filed Aug. 20, 2019, which is a continuation of U.S. patent application Ser. No. 16/283,378, entitled "SYSTEM AND METHOD FOR MANAGING ROUTING OF CUSTOMER CALLS TO AGENTS," filed Feb. 22, 2019, which is a continuation of U.S. patent application Ser. No. 16/110,872, entitled "SYSTEM AND METHOD FOR MANAGING ROUTING OF CUSTOMER CALLS TO AGENTS," filed Aug. 23, 2018, which claims the benefit of U.S. Provisional App. No. 62/551,690, filed Aug. 29, 2017, claims the benefit of U.S. Provisional App. No. 62/648,325, filed Mar. 26, 2018, claims the benefit of U.S. Provisional App. No. 62/648,330, filed Mar. 26, 2018, and claims the benefit of U.S. Provisional App. No. 62/687,130, filed Jun. 19, 2018, all of which are incorporated by reference in their entirety.

This application is a continuation of U.S. patent application Ser. No. 17/107,571, entitled "SYSTEM AND METHOD FOR MANAGING ROUTING OF CUSTOMER CALLS TO AGENTS," filed Nov. 30, 2020, which is also a continuation-in-part of U.S. patent application Ser. No. 17/013,312, entitled "SYSTEM AND METHOD FOR MANAGING ROUTING OF CUSTOMER CALLS TO AGENTS," filed Sep. 4, 2020, which is a continuation of U.S. patent application Ser. No. 16/739,967, entitled "SYSTEM AND METHOD FOR MANAGING ROUTING OF CUSTOMER CALLS TO AGENTS," filed Jan. 10, 2020, which is a continuation of U.S. patent application Ser. No. 16/455,983, entitled "SYSTEM AND METHOD FOR MANAGING ROUTING OF CUSTOMER CALLS TO AGENTS," filed Jun. 28, 2019, which is a continuation of U.S. patent application Ser. No. 16/267,331, entitled "SYSTEM AND METHOD FOR MANAGING ROUTING OF CUSTOMER CALLS TO AGENTS," filed Feb. 4, 2019, which is a continuation of U.S. patent application Ser. No. 16/111,011, entitled "SYSTEM AND METHOD FOR MANAGING ROUTING OF CUSTOMER CALLS TO AGENTS," filed Aug. 23, 2018, which claims the benefit of U.S. Provisional App. No. 62/551,690, filed Aug. 29, 2017, claims the benefit of U.S. Provisional App. No. 62/648,325, filed Mar. 26, 2018, claims the benefit of U.S. Provisional App. No. 62/648,330, filed Mar. 26, 2018, and claims the benefit of U.S. Provisional App. No. 62/687,130, filed Jun. 19, 2018, all of which are incorporated by reference in their entirety.

TECHNICAL FIELD

The present disclosure relates generally to customer contact centers and their operation, and more particularly to a system and method for managing routing of customer calls to agents.

BACKGROUND

Customer contact centers provide an important interface for customers/partners of an organization to contact the organization. The contact can be for a request for a product or service, for trouble reporting, service request, etc. The contact mechanism in a conventional call center is via a telephone, but it could be via a number of other electronic channels, including e-mail, online chat, etc.

The contact center consists of a number of human agents, each assigned to a telecommunication device such as a phone or a computer for conducting email or Internet chat sessions that is connected to a central switch. Using these devices, the agents generally provide sales, customer service, or technical support to the customers or prospective customers of a contact center or of a contact center's clients. Conventionally, a contact center operation includes a switch system that connects callers to agents. In an inbound contact center, these switches route inbound callers to a particular agent in a contact center, or, if multiple contact centers are deployed, to a particular contact center for further routing. When a call is received at a contact center (which can be physically distributed, e.g., the agents may or may not be in a single physical location), if a call is not answered immediately, the switch will typically place the caller on hold and then route the caller to the next agent that becomes available. This is sometimes referred to as placing the caller in a call queue. In conventional methods of routing inbound callers to agents, high business value calls can be subjected to a long wait while the low business value calls are often answered more promptly, possibly causing dissatisfaction on the part of the high business value caller.

In many call centers, the agents answering calls are organized into a plurality of groups or teams, with each group having primary responsibility of the calls in one or more call queues. Different agent groups often have responsibility for different goals or functions of the call center, such as generating customer leads, closing sales with prospects, and servicing existing customers. Routing an inbound caller to an appropriate group or team of the call center to address the needs of that caller can be a burdensome, time-consuming process.

There is a need for a system and method for identifying high business value inbound callers at a call center during a time period in which inbound callers are awaiting connection to an agent. Additionally, there is a need to improve traditional methods of routing callers, such as "round-robin" caller routing, to improve allocation of limited call center resources to high business value inbound callers. Further, there is a need to improve traditional methods of routing callers to a group or team of agents appropriate to the caller's needs from a plurality of agent groups that implement different functions or goals of the call center.

SUMMARY

Embodiments described herein can automatically route a call from a customer to one of a plurality of call queue assignments based on predicted value of the telephone call. Embodiments described herein can automatically route a call from a customer to one of a plurality of call queues associated with a plurality of groups of agents, based on information concerning an identified customer of an enterprise and predicted value of the telephone call to that enterprise.

In various embodiments, the method retrieves from a customer database a set of enterprise customer data associated with an identified customer in a customer call. The customer database stores enterprise customer data associated with prospects, leads, and purchasers of an enterprise, such as a sponsoring organization or client of the call center. In various embodiments, the enterprise customer data comprises one or more of customer event data, activity event data, and attributions data.

In an embodiment, the process then retrieves customer demographic data associated with the identified customer. In various embodiments, the customer demographic data may be associated with the identified customer by two or more identifying data including name of the identified customer, address of the identified customer, and zip code of the identified customer. In an embodiment, the customer management system obtains a customer identifier for the received customer call from caller information associated with the inbound call.

Disclosed embodiments select a predictive model from a plurality of predictive models. Each of the plurality of predictive models is configured to determine a respective business outcome signal representative of one or more of: likelihood of accepting an offer to purchase a product, likelihood of accepting an offer to purchase a product, likelihood of not lapsing in payments for a purchased product, and likelihood of accepting an offer to purchase a product and not lapsing in payments for the purchased products. The method and system selects the one of the plurality of predictive models for which the set of enterprise customer data has a highest importance in determining the respective business outcome signal.

A method for managing routing of customer calls to agents executes a selected predictive model to determine a value prediction signal. In various embodiments, the value prediction signal includes one or more of a first signal representative of the likelihood that the identified customer will accept an offer to purchase a product, a second signal representative of the likelihood that the identified customer will lapse in payments for a purchased product, and a third signal representative of the likelihood that the identified customer will accept an offer to purchase the product and will not lapse in payments for the purchased product. In an embodiment, the selected predictive model determines the value prediction signal in real time by applying a logistic regression model in conjunction with a tree-based model to the set of the enterprise customer data and the retrieved customer demographic data.

Based on the value prediction signal determined, the selected predictive model classifies the identified customer into one of a first value group and a second value group. When the predictive model classifies the identified customer into the first value group, the call management system routes the customer call for the identified customer to a first call queue assignment. When the predictive model classifies the identified customer into the second value group, the call management system routes the customer call for the identified customer to a second call queue assignment. In an embodiment, the first call queue assignment connects the identified customer to one of a first pool of call center agents who are authorized to present the offer to purchase a product, and the second call queue assignment connects the identified customer to one of a second pool of call center agents who are not authorized to present the offer to purchase a product.

In an embodiment, the first call queue assignment comprises a first queue position in a call queue, and the second call queue assignment comprises a second queue position in a call queue. In an embodiment, the call queue is a hold list for callers on hold for inbound customer calls. In an embodiment, the first call queue assignment includes a first call queue for connection to an agent from a first pool of call center agents, and the second call queue assignment includes a second call queue for connection to an agent from a second pool of call center agents. In another embodiment involving outbound customer calls (call backs) initiated in response to inbound calls, the call queue is a call back list.

The selected predictive model can include a logistic regression model and a tree-based model. In an embodiment, the logistic regression model employs $l_1$ regularization. In an embodiment, the logistic regression model employs $l_2$ regularization. In an embodiment, the tree-based model is a random forest ensemble learning method for classification. The value prediction signal can include one or more of a first signal representative of a likelihood that the identified customer will accept an offer to purchase a product, a second signal representative of a likelihood that the identified customer will lapse in payments for a purchased product, and a third signal representative of a likelihood that the identified customer will accept an offer to purchase the product and will not lapse in payments for the purchased product. In various embodiments, the value prediction signal is a buy-only signal, a lapse-only signal, a buy-don't-lapse signal, or combination of these signals.

Disclosed embodiments can automatically route a call from a customer to one of a plurality of call queues associated with a plurality of groups of agents, based on information concerning an identified customer and predicted value of the telephone call. In a first step, the method retrieves from a customer database a set of enterprise customer data associated with an identified customer in a customer call. The customer database stores enterprise customer data associated with prospects, leads, and purchasers of an enterprise, such as a sponsoring organization or client of the call center. In various embodiments, the enterprise customer data comprises one or more of customer event data, activity event data, and attributions data.

Various embodiments select a group of agents from a plurality of groups of agents of the call center, wherein the selected group of agents implements a predetermined customer care interaction of the call center. The group of agents is selected based upon consistency of the predetermined customer care interaction with the set of enterprise customer data for the identified customer.

In an embodiment of selecting a group of agents based upon consistency of the predetermined customer care interaction with the set of enterprise customer data, the predetermined customer care interaction is customer development of leads, and the set of enterprise customer data includes customer event data associated with a prospect. In an embodiment, the predetermined customer care interaction is cross-selling of products, and the set of enterprise customer data includes customer event data associated with a purchaser and activity event data indicating likelihood of an additional purchase. In another embodiment, the predetermined customer care interaction is promoting a given product, and the set of enterprise customer data includes activity event data indicating customer interest in a marketing campaign for the given product. In a further embodiment, the predetermined customer care interaction comprises closing product sales, and the set of enterprise customer data includes one or more of customer event data associated with a prospect, customer event data associated with a new business applicant, and attributions data associated with a prospect and a new business applicant.

In an embodiment, a processor-based method for managing customer calls within a call center comprises retrieving, by a processor, customer demographic data associated with a customer identifier for an identified customer in a customer call; determining, by a predictive model executing on the processor, a value prediction signal comprising one or more of a first signal representative of a likelihood that the identified customer will accept an offer to purchase a product, a second signal representative of a likelihood that the identified customer will lapse in payments for a purchased product, and a third signal representative of a likelihood that the identified customer will accept an offer to purchase the product and will not lapse in payments for the purchased product; wherein the predictive model comprises a logistic regression model operating in conjunction with a tree-based model; classifying, by the predictive model executing on the processor based on the value prediction signal determined by the predictive model, the identified customer into one of a first value group and a second value group; and, in the event the classifying step classifies the identified customer into the first value group, routing, by the processor, the identified customer to a first call queue for connection to one of a first pool of call center agents who are authorized to present the offer to purchase the product; in the event the classifying step classifies the identified customer into the second value group, routing, by the processor, the identified customer to a second call queue for connection to one of a second pool of call center agents who are not authorized to present the offer to purchase the product.

In an embodiment, a processor-based method for managing customer calls within a call center comprises, upon receiving a customer call at a call center from an identified customer, retrieving, by a processor, from a customer database that stores enterprise customer data associated with customers of an enterprise, a set of the enterprise customer data associated with the identified customer in the customer call, wherein the set of the enterprise customer data comprises one or more of customer event data, activity event data, and attributions data; retrieving, by the processor, customer demographic data associated with the identified customer in the customer call; selecting, by the processor, a predictive model from a plurality of predictive models, each of the plurality of predictive models being configured to determine a respective business outcome signal representative of one of more of likelihood of accepting an offer to purchase a product, not lapsing in payments for a purchased product, and accepting an offer to purchase a product and not lapsing in payments for the purchased products, wherein the selected predictive model is the one of the plurality of predictive models for which the set of enterprise customer data has a highest importance in determining the respective business outcome signal; executing, by the processor, the selected predictive model to generate a value prediction signal by applying a logistic regression model in conjunction with a tree-based model to the set of the enterprise customer data and the retrieved customer demographic data, the value prediction signal comprising one or more of a first signal representative of the likelihood that the identified customer will accept an offer to purchase a product, a second signal representative of the likelihood that the identified customer will lapse in payments for a purchased product, and a third signal representative of the likelihood that the identified customer will accept an offer to purchase the product and will not lapse in payments for the purchased product; classifying, by the selected predictive model executing on the processor based on the value prediction signal determined by the selected predictive model, the identified customer into one of a first value group and a second value group; and when the classifying step classifies the identified customer into the first value group, routing, by the processor, the customer call for the identified customer to a first call queue assignment; wherein the first call queue assignment comprises one or more of a first queue position in a call queue, and a first call queue for connection to an agent from a first pool of call center agents; and when the classifying step classifies the identified customer into the second value group, routing, by the processor, the customer call for the identified customer to a second call queue assignment; wherein the second call queue assignment comprises one or more of a second queue position in the call queue, and a second call queue for connection to an agent from a second pool of call center agents.

In an embodiment, a system for managing customer calls within a call center comprises an inbound telephone call receiving device for receiving a customer call to the call center; non-transitory machine-readable memory that stores a customer database including enterprise customer data associated with prospects, leads, and purchasers of an enterprise serviced by the call center, wherein the enterprise customer data comprises customer event data, activity event data, and attributions data; a predictive modeling module that stores a first predictive model of customer value, wherein the first predictive model comprises a first logistic regression model operating in conjunction with a first tree-based model configured to determine a first business outcome signal, and that stores a second predictive model of customer value; and that stores a second predictive model of customer value, wherein the second predictive model comprises a second logistic regression model operating in conjunction with a second tree-based model configured to determine a second business outcome signal; wherein each of the first business outcome signal and the second business outcome signal is representative of one or more of likelihood of accepting an offer to purchase a product, likelihood of not lapsing in payments for a purchased product, and likelihood of accepting an offer to purchase a product and not lapsing in payments for the purchased products; and a processor, configured to execute an inbound queue management module, wherein the processor in communication with the non-transitory machine-readable memory and the predictive modeling module executes a set of instructions instructing the processor to: upon receiving the customer call at the inbound telephone call receiving device from an identified customer, retrieve from the customer database a set of the enterprise customer data associated with the identified customer in the customer call, wherein the set of enterprise customer data comprises one or more of the customer event data, the activity event data, and attributions data; retrieve external third-party customer demographic data associated with the identified customer; select one of the first predictive model of customer value or the second predictive model of customer value, wherein for the selected predictive model the set of enterprise customer data has a highest importance in determining the respective business outcome signal; determine a value prediction signal for the identified customer via applying the selected predictive model to the set of the enterprise customer data and the retrieved customer demographic data; classify the identified customer into one of a first value group and a second value group based on the value prediction signal determined; and direct the inbound telephone call receiving device: when the inbound queue management module classifies the identified customer into the first value group, to route the customer call of the identified customer to a first call queue assignment; wherein the first call queue assignment comprises one or more of a first queue position in a call queue, and a first call queue for connection to an agent from a first pool of call center agents; and when the inbound queue management module classifies the identified customer into the second value group, to route the customer call of the identified customer to a second call queue assignment; wherein the second call queue assignment comprises one or more of a second queue position in the call queue, and a second call queue for connection to an agent from a second pool of call center agents.

In an embodiment, a processor-based method for managing customer calls within a call center comprises, upon receiving a customer call at a call center from an identified customer, retrieving, by a processor, from a customer database that stores enterprise customer data associated with customers of an enterprise, a set of the enterprise customer data associated with the identified customer in the customer call, wherein the set of the enterprise customer data comprises one or more of customer event data, activity event data, and attributions data; retrieving, by the processor, customer demographic data associated with the identified customer in the customer call; selecting, by the processor, a predictive model from a plurality of predictive models; each of the plurality of predictive models being configured to determine a respective business outcome signal representative of one of more of likelihood of accepting an offer to purchase a product, likelihood of not lapsing in payments for a purchased product, and likelihood of accepting an offer to purchase a product, and not lapsing in payments for the purchased products; wherein the selected predictive model is the one of the plurality of predictive models for which the set of enterprise customer data has a highest importance in determining the respective business outcome signal; executing, by the processor, the selected predictive model to generate the value prediction signal by applying a logistic regression model in conjunction with a tree-based model to the set of the enterprise customer data and the retrieved customer demographic data, the value prediction signal comprising one or more of a first signal representative of a likelihood that the identified customer will accept an offer to purchase a product, a second signal representative of a likelihood that the identified customer will lapse in payments for a purchased product, and a third signal representative of a likelihood that the identified customer will accept an offer to purchase the product and will not lapse in payments for the purchased product; classifying, by the selected predictive model executing on the processor based on the value prediction signal determined by the selected predictive model, the identified customer into one of a first value group and a second value group; and when the classifying step classifies the identified customer into the first value group, routing, by the processor, the customer call for the identified customer to a priority call queue assignment; wherein the priority call queue assignment comprises one or more of a priority queue position in a call queue, and a priority call queue for connection to an agent from a first pool of call center agents; and when the classifying step classifies the identified customer into the second value group, routing, by the processor, the customer call for the identified customer to a subordinate call queue assignment; wherein the subordinate call queue assignment comprises one or more of a subordinate queue position in the call queue, and a subordinate call queue for connection to an agent from a second pool of call center agents.

In an embodiment, a computer-implemented method for managing customer calls within a call center comprises retrieving, by a computer, customer data associated with a customer in a call session; executing, by the computer, a predictive machine-learning model configured to determine a value prediction signal representative of a likelihood of achieving a customer transaction by applying the predictive machine-learning model to the customer data, the predictive machine-learning model classifying the customer into a first value group or into a second value group, routing, by the computer, the customer to a first call queue in the event the customer is classified into the first value group; and routing, by the computer, the customer to a second call queue in the event the customer is classified into the second value group.

In an embodiment, a computer-implemented method for managing customer calls within a call center comprises retrieving, by a computer, customer data associated with an identified customer in a call session; executing, by the computer, a predictive machine-learning model configured to determine a value prediction signal representative of a likelihood of achieving a predetermined customer care interaction by applying the predictive machine-learning model to the customer data, the predictive machine-learning model classifying the identified customer into a first value group or into a second value group, routing, by the computer, the identified customer to a first call queue in the event the identified customer is classified into the first value group; and routing, by the computer, the identified customer to a second call queue in the event the identified customer is classified into the second value group.

In an embodiment, a system for managing customer calls within a call center comprises an inbound telephone call-receiving device for receiving a customer call to the call center and for associating the customer call with an identified customer; non-transitory, machine-readable memory that stores customer data; and a computer configured to execute a predictive modeling module, wherein the computer in communication with the non-transitory machine-readable memory executes a set of instructions instructing the computer to: in response to receiving the customer call, retrieve from the non-transitory, machine-readable memory a set of customer data associated with the identified customer; determine a value prediction signal representative of a likelihood of achieving a customer transaction by applying the predictive machine-learning model to the retrieved customer data; classify the identified customer into one of a first value group and a second value group based on the value prediction signal determined; and direct the inbound call receiving device: to route the identified customer to a first call queue in the event the computer classifies the identified customer into the first value group; and to route the identified customer to a second call queue in the event the computer classifies the identified customer into the second value group.

Other objects, features, and advantages of the present disclosure will become apparent with reference to the drawings and detailed description of the illustrative embodiments that follow.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

DETAILED DESCRIPTION

Figure 1:
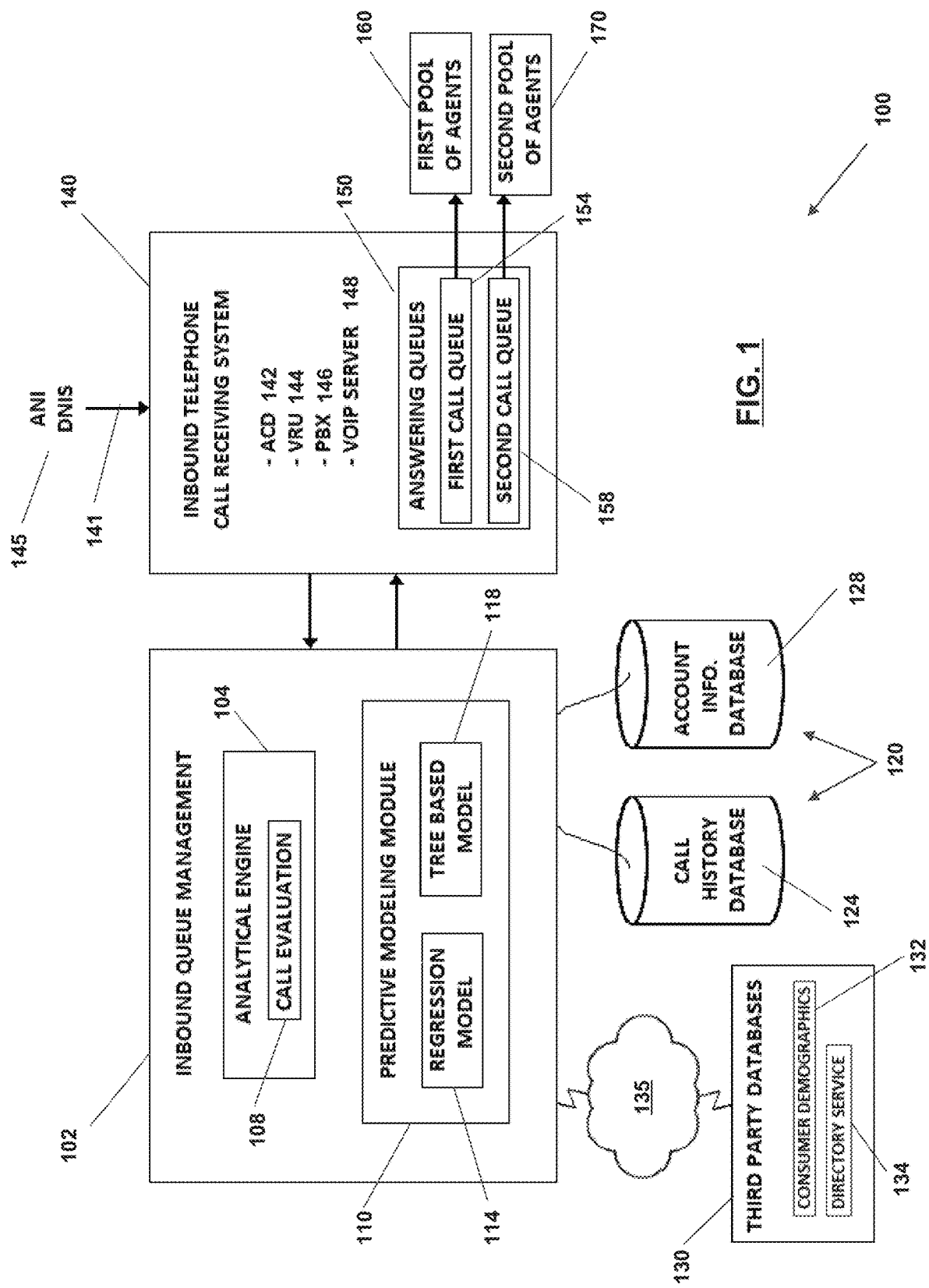
FIG. 1 is a system architecture for a customer management system of an inbound contact center, in accordance with an embodiment.

In the following detailed description, reference is made to the accompanying drawings which depict non-limiting, illustrative embodiments of the present disclosure. Other embodiments may be utilized and logical variations, e.g., structural and/or mechanical, may be implemented without departing from the scope of the present disclosure. To avoid unnecessary detail, certain information, items, or details known to those skilled in the art may be omitted from the following.

Contact routing at an inbound contact center can be structured in numerous ways. An individual employed by the contact center to interact with callers is referred to in the present disclosure as an "agent." Contact routing can be structured to connect callers to agents that have been idle for the longest period of time. In the case of an inbound contact where only one agent may be available, that agent is generally selected for the caller without further analysis. In another example of routing an inbound call, if there are eight agents at a contact center, and seven are occupied with callers, the switch will generally route the inbound caller to the one agent that is available. If all eight agents are occupied with contacts, the switch will typically put the caller on hold and then route the caller to the next agent that becomes available. More generally, the contact center will set up a queue of inbound callers and preferentially route the longest-waiting callers to the agents that become available over time. A pattern of routing callers to either the first available agent or the longest-waiting agent is sometimes referred to as "round-robin" caller routing.

In general, when a caller is placed in a call queue, the caller's queue position is dependent upon the receipt time of the call at the vendor location. No consideration is given to the identity of the caller or the potential value of the call. While this is a democratic way to handle inbound calls, it may not be good for business. For instance, a large number of low business value calls may be in a queue when a high business value call is received. As a result, the high business value call is subjected to a long wait while the low business value calls are answered—with attendant dissatisfaction on the part of the high business value caller. When call centers have an inadequate number of skilled agents to handle all callers, such as at times of peak call volume, challenges of effectively handling high-value callers can be especially severe. The method and system of the present disclosure are intended to alleviate these problems.

Call center operations include various types of call queues. For example, an inbound caller may be put on hold and placed on an answering queue or hold list, to be routed to a live agent when the caller has moved up to the first position in the call queue. In another example, if call centers are unable to route inbound callers to a live agent within a reasonable period of time, an inbound caller may be placed on a call back list, to receive a call back from a live agent when the caller has moved up to the first position on the call back list. In some embodiments, an inbound caller is assigned to one of a plurality of call queues (e.g., two queues) respectively associated with a plurality of pools of agents. In an illustrative embodiment, a first inbound caller is assigned to a first call queue to be routed to live agent in a first pool of agents who are skilled in sales and who are authorized to close a sale with the first caller, while a second inbound caller is assigned to a second call queue to be routed to live agent in a second pool of agents who are unskilled in sales and who are not authorized to close a sale with the second caller. As used in the present application, a "call queue assignment" means assignment of an inbound call from an identified customer to a call queue for connection to a call center agent. In various embodiments, the call queue assignment may include a given queue position and/or may include assignment to a call queue selected from a plurality of call queues.

Methods and systems described herein can automatically assign an inbound call from a customer to a call queue assignment based on predicted value of the inbound telephone call. The present system and method identifies an inbound caller with data from an internal customer database of an enterprise, e.g., sponsoring organization or client of the contact center. Upon identifying the customer, the process retrieves customer demographic data associated with the identified customer. The method selects a selected predictive model from a plurality of predictive models based upon enterprise customer data stored by the customer database for the identified customer. The selected predictive model determines a value prediction signal for the identified customer. Based on the value prediction signal determined, the predictive model classifies the identified customer into one of a first value group and a second value group. When the predictive model classifies the identified customer into the first value group, the call management system assigns the call received from identified customer to a first call queue assignment. When the predictive model classifies the identified customer to the second value group, the call management system assigns the call received from the identified customer to a second call queue assignment.

In an embodiment, the first value group comprises customers having a first set of modeled values, and the second value group comprises customers having a second set of modeled values, wherein modeled values in the first set of modeled values are higher than modeled values in the second set of modeled values. In an embodiment, the modeled values are modeled lifetime values. In an embodiment, when the predictive model classifies the identified customer into the first value group having higher modeled values, the call management system assigns the identified customer to a priority queue assignment; when the predictive model classifies the identified customer into the second value group having lower modeled values the call management system assigns the identified customer to a subordinate queue assignment. As used in the present disclosure, a priority queue assignment and subordinate queue assignment are relative terms, in which a priority queue assignment is more favorable than a subordinate queue assignment. In an embodiment, a priority queue assignment is a more advanced position within a given call queue than a subordinate queue assignment. In another embodiment, a priority queue assignment is an assignment to a more favorable call queue among a plurality of call queues (e.g., a queue for live connection to an agent from a pool of skilled agents) than a subordinate queue assignment (e.g., a queue for live connection to an agent from a pool of unskilled agents).

In other embodiments disclosed herein, an inbound caller is routed to one of a plurality of groups of call center agents (e.g., two groups), respectively associated with a plurality of call queues. Each group of agents is assigned to implement one or more predetermined function or goal of the call center; in the present disclosure a given goal or function of the call center is called a "customer care interaction." Customer care interactions may be broad in scope, such as generating customer leads, closing sales of products of a sponsoring enterprise of the call center, and customer service interactions with existing customers or purchasers (individuals who previously purchased a product of the sponsoring enterprise). Customer care interactions also can be more specific in scope, such as promoting a given product as part of a marketing campaign. The systems and methods of the present disclosure improve the routing of inbound calls of identified customers to groups of agents that handle customer care interactions appropriate to the callers.

Embodiments described herein can automatically assign an inbound call from a customer to a call queue position for connection to one of a plurality of groups of call center agents, wherein the call queue position is based on predicted value of the inbound telephone call. Upon receiving an inbound call, a call management system retrieves a set of enterprise customer data associated with an identified customer from a customer database. The system retrieves customer demographic data associated with the identified customer. In an embodiment, the system selects a group of agents from a plurality of groups of agents of the call center, wherein the selected group of agents implements a predetermined customer care interaction of the call center. The group of agents is selected based upon consistency of the predetermined customer care interaction with the set of enterprise customer data for the identified customer.

The customer database tracks individuals who are customers of a sponsoring organization or client of the call center, or other enterprise served by the call center, associating these individuals with one or more groups representing general types of customers. In an embodiment, these customer groups include prospects, leads, new business, and purchasers (also herein called sales). The customer database joins these four groups to better evaluate marketing activities and customer service activities of the call center. Data from the customer database is used in building stronger predictive models used for routing inbound calls; in the present disclosure, customer database data is sometimes called "enterprise customer data," denoting data relating to customers of the sponsoring enterprise. Enterprise customer data retrieved for an identified customer is used in selecting a suitable predictive model from a plurality of predictive models, based upon consistency of the selected predictive model as a modeling target with the set of enterprise customer data for the identified customer. Enterprise customer data is associated with one or more enterprise customer record identifying a given customer tracked by the customer data. Enterprise customer data includes data identified with one or more customer groups (also herein called customer event data), activity event data, and attributions data, among other types of data.

Methods and systems described herein can employ a pre-sale predictive model relating to offer for sale of one or more product offered or supplied by a sponsoring organization of an inbound contact center. In various embodiments, the products offered or supplied by a sponsoring organization require payments by the customer for a period following closing the sale, such as premiums to maintain in force an insurance policy or other financial product, or installment plans for product purchase. In various embodiments, the pre-sale predictive model incorporates information on a minimum period of time of customer payments required to achieve a beneficial transaction for the sponsoring organization, wherein failure of the customer to make payments over at least this minimum time period is sometimes referred to herein as "lapse." The presale predictive model forecasts customer behavior to improve the probability of closing a sale of an offered product to an inbound customer, and to reduce the probability that the customer will lapse in payment for the purchased product.

The predictive model can classify inbound callers into two or more groups. In an embodiment, two value groups are modeled to model higher predicted value and lower predicted value, respectively, to the sponsoring organization. In various embodiments, this classification governs value-based routing of inbound telephone calls for response by agents to allocate limited resources of the inbound contact center. An individual employed by the contact center to interact with callers is referred to herein as an "agent."

The inbound contact center is sometimes called simply a contact center or a call center. The individuals that interact with the contact center using a telecommunication device are referred to herein as callers, and alternatively are referred to as inbound callers, as customers, or as any of the general types of customer. As used in the present disclosure, a "customer" may be an existing customer or a prospective customer of the sponsoring organization, including any of the general groups of customer tracked in the customer database. In an embodiment, a customer is associated with the one or more of the groups: prospects, leads, new business, and sales (also herein called purchasers). A given individual may be associated with multiple such groups over different stages of customer acquisition. For example, a purchaser may have previously been one or more of a prospect, a lead, or a new business applicant.

In an embodiment of the customer groups in the customer database, "prospects" are individuals that have contacted the enterprise. Inbound prospects may or may not be customers in the customer databases. In an embodiment, if an inbound caller is not identified with an individual in the customer database, the database opens a new record for that caller in the prospects group. "Leads" are individuals who have expressed interest in one or more products of the enterprise; as used herein, products may include goods or services sold by the enterprise, or a combination of these. A lead may have previously been a prospect, or may not have been a prospect (e.g., an individual that searches for products or services of the enterprise online). "New Business" (also herein called new business applicants) identifies applicants to purchase one or more product of the enterprise, where such purchase requires underwriting. These applicants may have been prospects, leads, or both. "Purchasers" (also herein called "sales") generally are individuals that own a product of the enterprise. Purchasers may have been prospects, leads, new business applicants, or any combination of these groups.

Methods and systems described herein can employ a predictive model relating to offering for sale one or more products offered or supplied by a sponsoring organization of an inbound contact center. In various embodiments, the products offered or supplied by a sponsoring organization require payments by the customer for a period following closing the sale, such as premiums to maintain in force an insurance policy or other financial product, or installment plans for product purchase. A pre-sale prediction model can incorporate information on a minimum period of time of customer payments required to achieve a beneficial transaction for the sponsoring organization and uses this information in determining conditions for "lapse." The pre-sale predictive model forecasts customer behavior to improve the probability of closing a sale of an offered product to an inbound customer, and to reduce the probability that the customer will lapse in payment for the purchased product.

The predictive model can classify inbound callers into two or more value groups. In an embodiment, two value groups are modeled to model higher predicted value and lower predicted value, respectively, to the sponsoring organization. In various embodiments, this classification governs value-based routing of inbound telephone calls for response by agents, to allocate limited resources of the inbound contact center. An individual employed by the contact center to interact with callers is sometimes referred to herein as an "agent."

A key metric for value-based classification of a customer who has purchased a product is called a "lifetime value" of the product sale to that customer. In various embodiments, lifetime value includes the sum of all associated costs over product lifetime, netted against revenue for the product sale. The lifetime value for the product (insurance policy) sold to that customer is the net value of all premiums paid, over the sum of all such associated costs during that policy life.

In an illustrative embodiment involving sale of an insurance policy, associated costs over product lifetime include various sales acquisition costs, including marketing costs distributed across inbound calls, cost of operating the inbound contact center distributed across inbound calls, and commission at the time of sale. In this example, additional associated costs include cost of providing the insurance policy, and claims or death benefit. In various embodiments, total costs for a customer are modeled based on the customer's age, gender, policy face amount, and whether the policy is lapsed, and by applying formulas based on amortization of total marketing costs and operations costs. In an illustrative embodiment involving sale of an insurance policy, total revenue for a customer is modeled based on the customer's age, gender, policy face amount, and whether the policy is lapsed (if so, when). The model calculates expected total premium payments based on age and gender via lookup of mortality statistics.

Methods and systems described herein can identify lapse (e.g., for a given product or class of products) with a pre-determined period of time following sale of the product and define lapse as failure of the customer to make payments for the product over at least this period of time. In various embodiments, this predetermined period of time is based upon modeling a minimum period of time for achieving a positive lifetime value for the product sale. This model compares total payments received with associated costs over different product lifetimes to determine the predetermined period. In one embodiment, product lifetime represents a period of time over in which the customer has continued to make purchase payments for the product, such as premiums or installment payments. In another embodiment, lifetime value is measured during the full term or life of an insurance policy or other financial instrument until all claims and death benefits have been paid, even if all premiums or other customer payments had been paid prior to this time.

FIG. 1 shows a system architecture for a customer management system 100, according to an illustrative embodiment. In the present disclosure, the customer management system 100 is sometimes called an inbound call center or inbound contact center, referring to its primary function of receiving inbound customer calls. Customer management system 100 includes an inbound queue management system 102, also called an inbound call management system. Inbound queue management system 102 manages assignment of inbound telephone calls for response by agents to multiple queues (e.g., two queues) based on predicted value of the inbound telephone call. Inbound queue management system 102 includes an analytical engine 104 containing a call evaluation sub-module 108, and a predictive modeling module 110 including a regression model 114 and a tree-based model 118.

Inbound call management system 102 is interfaced with one or more internal databases 120 of the inbound contact center, such as call history database 124 and account information database 128. In an embodiment, analytical engine 104 interacts with external services, applications, and databases, such as third party databases 130, through one or more application programmable interfaces, an RSS feed, or some other structured format, via communication network 135. In the embodiment of FIG. 1, inbound queue management system 102 retrieves data from one or more third party databases 130, including a consumer demographic database 132 and a directory service database 134.

Predictive modeling module 110 builds one or more models that model behaviors of customers such as likelihood that a caller will purchase a product offered by the call center, and likelihood that the caller will lapse in payments for a purchased product. The predictive modeling module analyzes each inbound customer call using data associated with a customer identifier for the inbound caller. This customer identifier may be obtained from various sources by the call evaluation sub-module 108. Input data used in predictive modeling includes data retrieved from one or more of internal databases 120, and third party databases 130. This input data also may include data derived from the retrieved data that has been transformed by analytical engine 104 in order to facilitate predictive modeling, as described herein.

Databases 120 are organized collections of data, stored in non-transitory machine-readable storage. In an embodiment, the databases may execute or may be managed by database management systems (DBMS), which may be computer software applications that interact with users, other applications, and the database itself, to capture (e.g., store data, update data) and analyze data (e.g., query data, execute data analysis algorithms). In some cases, the DBMS may execute or facilitate the definition, creation, querying, updating, and/or administration of databases. The databases may conform to a well-known structural representational model, such as relational databases, object-oriented databases, and network databases. Database management systems may include MySQL, PostgreSQL, SQLite, Microsoft SQL Server, Microsoft Access, Oracle, SAP, dBASE, FoxPro, IBM DB2, LibreOffice Base, or FileMaker Pro.

Analytical engine 104 can be executed by a server, one or more server computers, authorized client computing devices, smartphones, desktop computers, laptop computers, tablet computers, PDAs and other types of processor-controlled devices that receive, process, and/or transmit digital data. Analytical engine 104 can be implemented using a single-processor system including one processor, or a multi-processor system including any number of suitable processors that may be employed to provide for parallel and/or sequential execution of one or more portions of the techniques described herein. Analytical engine 104 performs these operations as a result of central processing unit executing software instructions contained within a computer-readable medium, such as within memory. In one embodiment, the software instructions of the system are read into memory associated with the analytical engine 104 from another memory location, such as from a storage device or from another computing device via communication interface. In this embodiment, the software instructions contained within memory instruct the analytical engine 104 to perform processes described below. Alternatively, hardwired circuitry may be used in place of or in combination with software instructions to implement the processes described herein. Thus, implementations described herein are not limited to any specific combinations of hardware circuitry and software.

Predictive modeling module 110 generates a value prediction signal representative of one or more of the following customer behaviors: (a) likelihood that the customer will accept an offer to purchase a product, (b) likelihood that the customer will lapse in payments for a purchased product, and (c) likelihood that the customer will accept an offer to purchase the product and will not lapse in payments for the purchased product. In certain embodiments, the predictive modeling module can predict more than one of these customer behaviors. For example, the predictive model may first determine the customer behavior (a) likelihood that the customer will accept an offer to purchase a product, followed by determining the customer behavior (b) likelihood that the customer will lapse in payments for a purchased product, in order to determine a value prediction signal. Based on this value prediction signal, the analytical module, in conjunction with the predictive modeling module, classifies each customer call into one of two, or more, value groups. Depending on the value group determined for each customer call, analytical engine 104 directs routing of the customer call to one of two or more answering queues 150 to await connection to an agent of the call center. In FIG. 1, two call queues 154 and 158 are shown. Value-based classification of inbound calls by inbound call management system 102 represents a significant improvement over traditional methods of routing callers, such as "round-robin" caller routing.

Inbound call management system 102 interfaces with an inbound telephone call receiving system 140. In customer management system 100, inbound call management system 102 and call receiving system 140 may be integrated in a single computing platform. Alternatively these systems may be based on separate computing platforms. In certain embodiments, the computing platform(s) are interfaced with computer-telephone integration ("CTI") middleware. In an embodiment, inbound telephone call receiving system 140 includes a telephony device that accepts inbound telephone calls through a telephony interface 141, such as conventional T1 or fiber interfaces. Inbound telephone call receiving system 140 accepts inbound telephone calls through interface 141 and obtains caller information associated with the inbound calls, such as Automatic Number Identification ("ANI") and Dialed Number Identification Service ("DNIS") information 145. ANI is a signaling system feature in which a series of digits, either analog or digital, are included in the call identifying the source telephone number of the calling device. DNIS is a telephone function that sends the dialed telephone number to an answering service. The DNIS need not be a telephone number associated with any physical location.

Inbound telephone call receiving system 140 may include an Automatic Call Distributor ("ACD") system 142; a Voice Response Unit ("VRU") system 144; a private branch exchange ("PBX") switch 146; a Voice over Internet Protocol ("VOIP") server 148; or any combination of such devices. In an embodiment, intrasite telephony access within the call center may be managed by a private branch exchange (PBX) switch 146. In an embodiment, PBX switch 146 operates in coordination with ACD 142 to distribute inbound calls customer service stations locally networked call center agents, such agents in first pool 160 and second pool 170. In further embodiments, inbound inquiries may include e-mail or instant messages that provide inquiry information based on login ID, e-mail address, IP, or instant message address. In such an embodiment, the call center can gather additional information by an automated e-mail or instant message survey response, which can be used to request various types of customer identifier data.

An identified customer can be an inbound caller for which the customer management system 100 has obtained reliable identifying data. This data is used by inbound queue management system 102 to retrieve or identify data associated with that customer. In an embodiment, an identified customer is a customer for which the system 100 has reliably identified at least two of name, address, and zip code. In an embodiment, Voice Response Unit ("VRU") system 144 collects customer identifier data, such as name, address, and zip code, through automated interaction with the customer. In the present disclosure, this VRU data collection is sometimes called a telegreeter. For instance, VRU 144 may query an inbound caller to collect customer identifier information when ANI is not operative, e.g., when caller-ID is blocked. In an embodiment, inbound call management system 102 communicates with a third party directory service 134. Directory service 134 can provide additional caller identification information, such as name and address information, for inbound callers that are initially identified only by a telephone number. For an inbound caller that is a new lead of the enterprise, this additional caller identification information can be stored in Account Info database 128 as profile data for that lead.

Inbound telephone calls received through interface 141 are distributed to answering queues 150 for response by agents operating telephony devices. In the embodiment of FIG. 1, answering queues 150 include a first call queue 154 for response by one of the agents in a first pool 160 of call center agents, and a second call queue 158 for response by one of the agents in a second pool of agents 170. Although FIG. 1 depicts an embodiment of the present invention that orders inbound telephone calls, alternative embodiments apply inbound queue management to schedule other types of inbound inquiries, such as e-mail or instant message inquiries. In an embodiment, call center agents in agent pools 160 and 170 are groups of customer service representatives or agents deployed at workstations or agent devices communicatively coupled to call management system 100.

The agents are associated with a sponsoring organization that sells or supplies products with the assistance of the call center. In an embodiment, the organization generates sales of one or more product through advertisements that give a phone number to prospective customers, and the prospective customers call into the call center using this phone number. In various embodiments, the agents in first pool 160 are authorized to offer an advertised product to a prospective customer (inbound caller), while the agents in second pool 170 are not authorized to offer the advertised product. In the present disclosure, for an agent to be authorized to offer a product to a prospective customer or lead means that the agent is authorized to pursue a sale of the product to the lead.

A sponsoring organization for customer management system 100 is an insurance company or other financial services company, and the agents may include insurance agents. In some cases, an insurance agent may be associated with only a single insurance provider (sometimes referred to as a "captive" insurance agent). In other cases, an "independent" insurance agent may be associated with several different insurance providers. In an embodiment, the agents in the first pool 160 are licensed to sell insurance. In some cases, the producers may be licensed to sell different types of insurance products, might have different areas of expertise, needs, etc. In some embodiments, agents in the first pool 160 are selected for performance metrics related to sales. Agent sales performance may be measured by aggregate sales productivity metrics, as well as distributed performance metrics such as sales metrics by product types, etc.

While the agents in second pool 170 are not authorized to offer the product(s) to the inbound caller (prospective customer or lead), these agents perform an important role in lead nurturing. Forwarding an inbound inquiry to a live agent with little or no wait time, sometimes referred to herein as a "warm transfer," has been observed to significantly increase probability of a successful sale to that customer in a later interaction. In some embodiments, agents in the second pool 170 are selected for skills related to agent-customer communications, which can be measured in indicators of customer satisfaction such as feedback on customer experiences.

Figure 2:
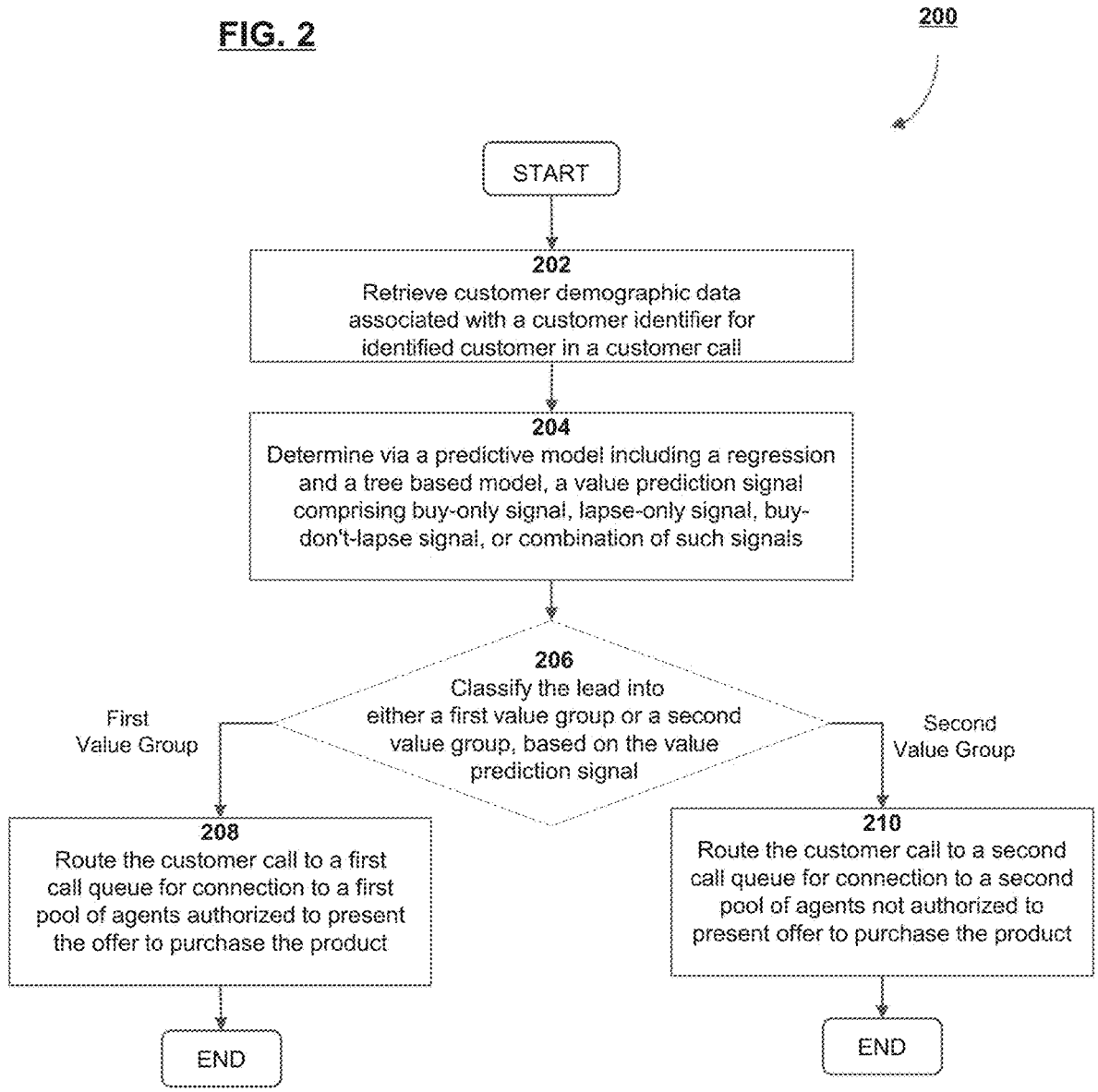
FIG. 2 illustrates a method for routing a customer call to an agent, in accordance with an embodiment.

FIG. 2 is a flowchart of a call management process 200 for automatically routing an inbound call from a customer to one of a plurality of call queue assignments based on predicted value of the inbound telephone call. The method retrieves from a customer database a set of enterprise customer data associated with an identified customer in a customer call. The customer database stores enterprise customer data associated with prospects, leads, and purchasers of an enterprise. In certain embodiments, the customer database also stores enterprise customer data associated with new business applicants of the customer enterprise. The process then retrieves customer demographic data associated with the identified customer.

The method 200 selects a predictive model from a plurality of predictive model, by selecting a predictive model for which the set of enterprise customer data has the highest expected impact on likelihood of a respective business outcome associated with that predictive model. The selected predictive model, including a logistic regression model operating in conjunction with a tree-based model, determines a value prediction signal for the identified customer. Based on the value prediction signal determined, the predictive model classifies the identified customer into one of a first value group and a second value group. When the predictive model classifies the identified customer into the first value group, the call management system routes the call received from identified customer to a first call queue assignment, i.e., first queue position and/or first call queue. When the predictive model classifies the identified customer into the second value group, the call management system routes the call received from identified customer to a second call queue assignment, i.e., second queue position and/or second call queue.

The steps of process 200 may be performed by one or more computing devices or processors in the customer management system of FIG. 1. In an embodiment, the plurality of steps included in process 200 may be performed by an inbound queue management system 102 of a customer management system 100 of a call center, in operative communication with an inbound call receiving system 140 that receives a customer call of the identified customer.

The call management process 200 is initiated at step 202 in response to the customer management system 100 receiving an incoming customer call, by retrieving from a customer database enterprise customer data associated with an identified customer in the customer call. The customer database stores enterprise customer data associated with prospects, leads, and purchasers of an enterprise. In various embodiments, the enterprise customer data used in selecting the selected predictive model comprises one or more of customer event data, activity event data, and attributions data. In certain embodiments, the customer database also stores enterprise customer data associated with new business applicants of the enterprise.

At step 204, the call management process retrieves customer demographic data associated with the identified customer. In an embodiment, the process retrieves the customer demographic data from a third party database. In an embodiment, the third party customer demographic data is associated with identified customer by matching the data to one or more enterprise customer identifier stored by the customer database. In an embodiment, the call management process builds a simplified data file from the set of enterprise customer data and the retrieved third party demographic data as input to further steps of the process.

At step 206, the call management process selects a predictive model from a plurality of predictive models stored by the customer management system. Each of the plurality of predictive model is configured to predict likelihood of a respective business outcome comprising one or more of likelihood and accepting an offer to purchase a product, likelihood of not lapsing in payments for a purchased product, and likelihood of accepting an offer to purchase a product and not lapsing in payments for the purchased products. Step 206 selects the one of the plurality of predictive models for which the set of enterprise customer data has the highest expected impact on likelihood of the respective business outcome. In an embodiment, the predictive model is selected based on highest expected likelihood of achieving one or more business outcome associated with that predictive model. In various embodiments of step 206, the predictive model is selected based upon enterprise customer data for the inbound caller including one or more of customer event data, activity event data, and attributions data.

In an embodiment of step 206, the respective business outcome comprises one or more of the following general buy/lapse behaviors: accepting an offer to purchase a product, not lapsing in payments for a purchased product, and accepting an offer to purchase a product and not lapsing in payments for the purchased products. In an embodiment, the respective business outcome comprises a more specific business outcome, such as a business outcome representing an instance of one of these general buy/lapses behaviors. In an illustrative embodiment, the respective business outcome is likelihood of purchase of a given product of the enterprise. In another illustrative embodiment, the respective business outcome is likelihood of lapse, targeted to new business applicants of the enterprise.

In an embodiment of step 206, the respective business outcome of the selected business model targets one or more of the prospects, leads, and purchasers of the enterprise, and the enterprise customer data comprises customer event data associated with the one or more prospects, leads, and/or purchasers of the enterprise targeted by the respective business outcome. In an example, based on enterprise customer data associated with a prospect, step 206 selects a predictive model targeted at prospects in which the respective business outcome includes likelihood of generating customer leads. In another example, based upon enterprise customer data associated with a purchaser, step 206 selects a predictive model targeted at purchasers for which the respective business outcome includes likelihood of cross selling an additional product to the purchaser.

In another embodiment of step 206, the set of enterprise customer data includes activity event data, and the predictive model is selected based upon the one of the plurality of predictive models for which the activity event data has the highest expected impact on the likelihood of the respective business outcome. In an example, the predictive model is selected based on enterprise customer data for a sale of an insurance product, including activity event data indicating failure to pay first year premiums. The selected predictive model models the likelihood that the identified customer will lapse in payments for a purchased product.

At step 208, the call management process executes the selected predictive model to determine a value prediction signal. In an embodiment, the selected predictive model applies a logistic regression model in conjunction with a tree-based model to the set of the enterprise customer data and the retrieved customer demographic data. In an embodiment, the call management process executes the selected predictive model to determine the value prediction signal in real time. By determining the value prediction signal in real time, the present method automatically routes incoming customer calls to a call queue assignment expeditiously.

In various embodiments of step 208, the value prediction signal includes one or more of a first signal representative of a likelihood that the identified customer will accept an offer to purchase a product, a second signal representative of a likelihood that the identified customer will lapse in payments for a purchased product, and a third signal representative of a likelihood that the identified customer will accept an offer to purchase the product and will not lapse in payments for the purchased product.

In various embodiments of step 208, the value prediction signal determines a likelihood that the identified customer will lapse in payments for a purchased product by determining a likelihood that the identified customer will fail to make a payment for the purchased product during a predetermined time period following purchase of the purchased product. In an embodiment, the predetermined time period was previously determined by modeling lifetime value over varying durations of the time period following purchase of the purchased product.

In various embodiments of step 208, the regression model employs $l_1$ regularization. In various embodiments, the logistic regression model employs $l_2$ regularization. In various embodiments, the tree-based model is a random forests ensemble learning method for classification.

At step 210, the call management process classifies the customer call for the identified customer into either a first value group or a second value group, based on the value prediction signal determined at step 208. In an embodiment of step 210, the first value group includes customers having a first set of modeled lifetime values, and the second value group includes customers having a second set of modeled lifetime values. The modeled lifetime values in the first set of modeled lifetime values are higher than modeled lifetime values in the second set of modeled lifetime values.

When step 210 classifies the identified customer into the first value group, at step 212 the call management process routes the identified customer to a first call queue assignment. When step 210 classifies the identified customer into the second value group, at step 214 the call management process routes the identified customer to a second call queue assignment.

In various embodiments of steps 212 and 214, the first call queue assignment comprises a first queue position in a call queue, and the second call queue assignment comprises a second queue position in a call queue. In one embodiment, the call queue is a hold list for callers on hold. In another embodiment, the call queue is a call back queue.

In another embodiment of steps 212 and 214, the first call queue assignment is a first call queue for connection to an agent from a first pool of call center agents. The second call queue assignment is a second call queue for connection to an agent from a second pool of call center agents.

In various embodiments, the agents to which customers are routed at steps 212 and 214 are associated with a sponsoring organization that sells or supplies products with the assistance of the call center. In an embodiment, the organization generates sales of one or more product through advertisements that give a phone number to potential or prospective customers, and the potential customers call into the call center using this phone number. In embodiments of step 210 in which the first value group includes customers having modeled lifetime values that are higher than modeled lifetime values of customers in the second value group, steps 212 and 214 prioritize call center resources to pursue sale of offered product(s) to the higher-value group of customers.

In certain embodiments of steps 210, 212, and 214, in which calls received from an identified customer are routed to one of a first call queue and a second call queue, the routing process can permit adjustments to take into account matching of call center resources (agents) to customers at a given time, herein referred to as resource matching adjustments. As seen in the schematic diagram of a customer queue arrangement 300 at FIG. 3, first call queue 302 consists of a queue of length M (last queue position 306), to be connected to agents 310 in a first pool of agents who are authorized to present an offer to purchase the product. Second call queue 304 consists of a queue of length N (last queue position 308), to be connected to agents 312 in a second pool of agents who are not authorized to present an offer to purchase the product.

In various embodiments, resource matching adjustments can including adjustments to the binary classification model that classifies customers into first and second value groups. For example, if there are a disproportionately high number of agents in the first pool 310 compared to the second pool 312, the threshold for the first value group can be reduced to permit routing of additional customers to the first pool of agents. In another example, if there are a disproportionately low number of agents in the first pool 310 compared to the second pool 312, the threshold for the first value group can be raised to permit routing of fewer customers to the first pool of agents.

In various embodiments, resource matching adjustments can include adjustments to the first queue of customers and second queue of customers. Such adjustments may take into account the total population of customers awaiting connection to call center agents, i.e., the customers in both queues 302 and 304 at a given time. At certain times there may be an unusual distribution of customers between the first and second queues, e.g., a disproportionately high number of customers in the first queue (M is unusually high relative to N) or a disproportionately low number of customers in the first queue (M is unusually low relative to N). To address these unusual distributions, one or more customer may be shifted from the first queue 302 to the second queue 304, or one or more customer may be shifted from the second queue 304 to the first queue 302.

Both types of resource matching adjustment, i.e., adjustment of the classification model, and direct adjustment of the call queues, may be combined.

Figure 4:
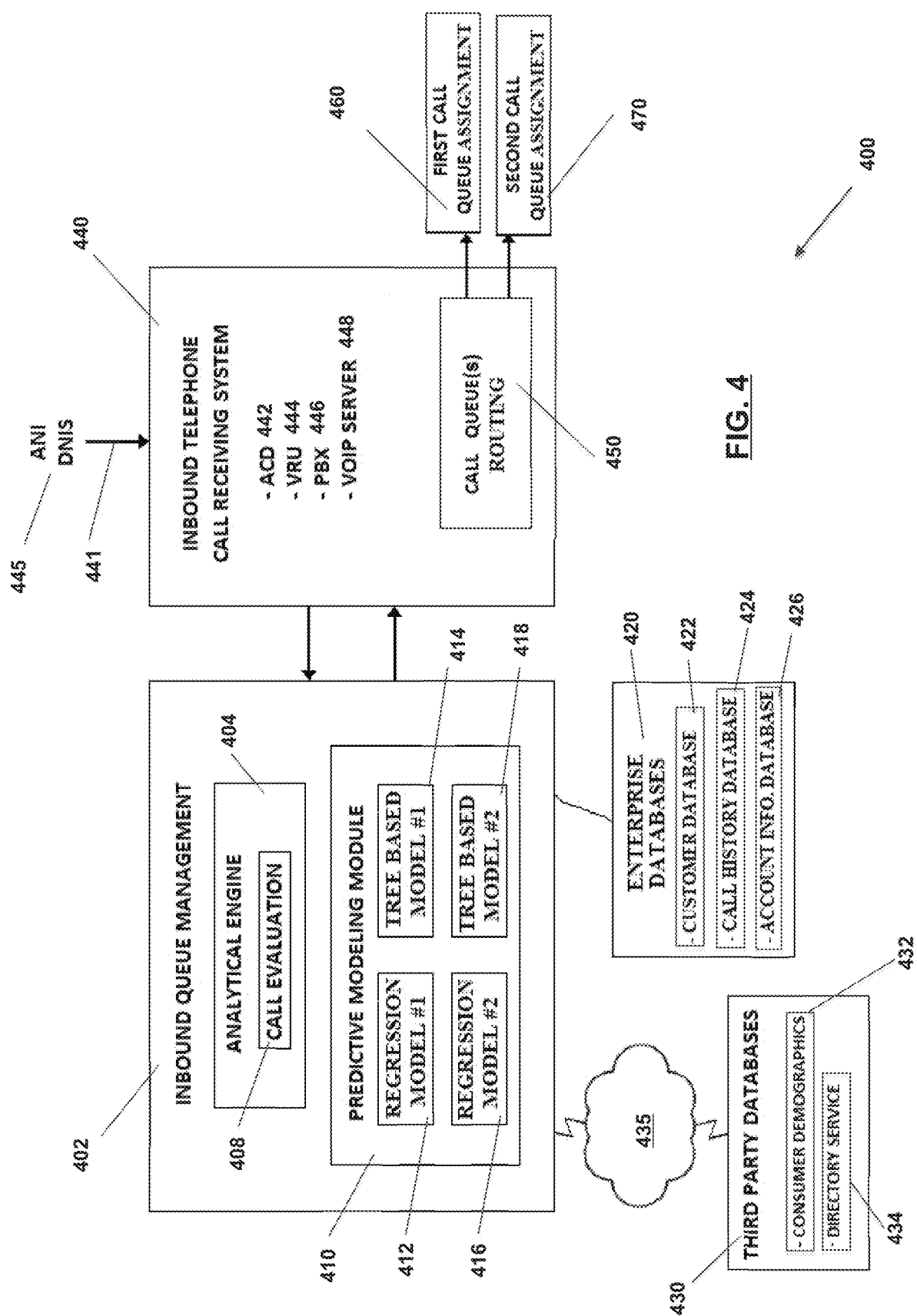
FIG. 4 is a system architecture for a customer management system of a contact center, in accordance with an embodiment.

FIG. 4 shows a system architecture for a customer management system 400 of a contact center, also herein called a call center, according to an illustrative embodiment. In the present disclosure, the call center is sometimes called an inbound call center or inbound contact center, referring to its primary function of receiving inbound customer calls. However, it should be understood that communications of the inbound call center on occasion may include outbound calls, or call backs, in response to inbound customer calls. Customer management system 400 includes an inbound queue management system 402, also called an inbound call management system. Inbound queue management system 402 manages assignment of inbound telephone calls for response by agents based on predicted value of the inbound telephone call. Inbound queue management system 402 includes an analytical engine 404 containing a call evaluation sub-module 408, and a predictive modeling module 410 including first and second regression models 412 and 416, and first and second tree-based models 414 and 418.

Inbound call management system 402 is interfaced with one or more enterprise databases 420, which are internal databases of the inbound contact center. Internal databases include customer database 422, which tracks individuals who are customers of the sponsoring organization of the call center or other client enterprise. Other internal databases include call history database 424 and account information database 426. In an embodiment, analytical engine 404 interacts with external services, applications, and databases, such as third party databases 430, through one or more application programmable interfaces, an RSS feed, or some other structured format, via communication network 435. In the embodiment of FIG. 4, inbound queue management system 402 retrieves data from one or more third party databases 430, including a consumer demographic database 432, and a directory service database 434.

Predictive modeling module 410 includes two or more models that model behaviors of customers such as likelihood that a caller will purchase a product offered by the call center, and likelihood that the caller will lapse in payments for a purchased product. The predictive modeling module analyzes each inbound customer call using data associated with a customer identifier for the inbound caller. This customer identifier may be obtained from various sources by the call evaluation sub-module 408, including enterprise customer data retrieved from customer database 422. Input data used in predictive modeling includes data retrieved from customer database 422 and may include data from other internal databases 420. Additionally, input data used in predictive modeling includes data from third party databases 430. This input data also may include data derived from the retrieved data that has been transformed by analytical engine 404 in order to facilitate predictive modeling, as described herein.

In the system and method of the present disclosure, for each identified customer predictive modeling module 410 selects among two or more predictive models by selecting a predictive model for which a set of enterprise customer data for the identified customer has the highest expected impact on likelihood of a respective business outcome associated with that predictive model. In an embodiment, each of the plurality of predictive models is configured to determine a business outcome signal representative of one of more of likelihood of accepting an offer to purchase a product, and the selected predictive model is the one of the plurality of predictive models for which the set of enterprise customer data has a highest importance in determining the respective business outcome signal. In an embodiment, analytical engine 404 analyzes the set of enterprise customer data retrieved and selects either a first predictive model that includes regression model #1 412 and tree-based model #1 414 (collectively called predictive model #1), or a second predictive model that includes regression model #2 416 and tree-based model #2 418 (collectively called predictive model #2). In other embodiments, predictive modeling module 410 can include more than two predictive models, and analytical engine 404 can select combinations of component models (e.g., regression model and tree-based model) other than predetermined pairings of these component models. The selection of predictive models based upon consistency of the selected predictive model as a modeling target with a set of enterprise customer data retrieved for an identified customer improves reliability of value-based classification of identified customer for call routing. In addition, predictive modeling module 410 may build stronger predictive models using enterprise customer data of the sponsoring organization.

In an embodiment, predictive model #1 412 and 414 is configured to determine a first business outcome signal representative of the likelihood of a first business outcome, and predictive model #2 416 and 418 is configured to determine a first business outcome signal representative of the likelihood of a second business outcome. In various embodiments, each of the first business outcome and the second business outcome comprises one or more of accepting an offer to purchase a product, not lapsing in payments for a purchased product, and accepting an offer to purchase a product and not lapsing in payments for the purchased products. The analytical engine 404 retrieves a set of enterprise customer data associated with an identified customer, and selects either predictive model #1 or predictive model #2 to generate a value prediction signal for the identified customer. In an embodiment, analytical engine 404 selects the predictive model for which the set of enterprise customer data has the higher importance in determining the respective business outcome signal.

In an embodiment, analytical engine 404 includes logic for selecting a predictive model from a plurality of predictive models for which a set of enterprise customer data retrieved for an identified customer has the highest importance in determining the respective business outcome. In an embodiment, analytical engine 404 stores lookup tables each of the predictive models within predictive modeling module 410 with table entries for various enterprise customer data, wherein each table entry includes an expected impact on business value. In an embodiment, analytical engine 404 applies business logic to forecasting expected impact on business value for given categories of enterprise customer data, and for weighing two or more enterprise customer data as components of overall importance in determining expected impact on likelihood of the respective business outcome. In an embodiment, analytical engine 404 adjusts the weight of two or more enterprise customer data as components of overall importance in determining expected impact on likelihood of the respective business outcome, depending on circumstances of the call center management system 400. For example, in the context of a call center campaign focused on one or more types of customer (prospect, lead, purchaser, new business applicant), analytical engine 404 may place greater importance on customer event data and attributions data than on activity event data in determining the respective business outcome.

Predictive modeling module 410 generates a value prediction signal representative of one or more of the following customer behaviors: (a) likelihood that the customer will accept an offer to purchase a product, (b) likelihood that the customer will lapse in payments for a purchased product, and (c) likelihood that the customer will accept an offer to purchase the product and will not lapse in payments for the purchased product. In certain embodiments, the predictive modeling module can predict more than one of these customer behaviors. For example, the predictive model may first determine the customer behavior (a) likelihood that the customer will accept an offer to purchase a product, followed by determining the customer behavior (b) likelihood that the customer will lapse in payments for a purchased product, in order to determine a value prediction signal. Based on this value prediction signal, the analytical module, in conjunction with the predictive modeling module, classifies each customer call into one of two, or more, value groups. Depending on the value group determined for each customer call, analytical engine 404 directs routing of the customer call to call queue routing module 450 to await connection to an agent of the call center. Call queue routing module 450 assigns each inbound caller to one of two or more call assignments based on the value prediction signal for that caller; in FIG. 4, two call queue assignments—first call queue assignment 460 and second call queue assignment 470—are shown. Value-based classification of inbound calls by inbound call management system 402 represents a significant improvement over traditional methods of routing callers, such as "round-robin" caller routing.

Inbound call management system 402 interfaces with an inbound telephone call receiving system 440. In customer management system 400, inbound call management system 402 and call receiving system 440 may be integrated in a single computing platform. Alternatively, these systems may be based on separate computing platforms. In certain embodiments, the computing platform(s) are interfaced with computer-telephone integration ("CTI") middleware. In an embodiment, inbound telephone call receiving system 440 includes a telephony device that accepts inbound telephone calls through a telephony interface 441, such as conventional T1 or fiber interfaces. Inbound telephone call receiving system 440 accepts inbound telephone calls through interface 441 and obtains caller information associated with the inbound calls, such as Automatic Number Identification ("ANI") and Dialed Number Identification Service ("DNIS") information 445. Reference may be had to the description of inbound telephone call receiving system 140 (FIG. 1), for a description of corresponding components of inbound telephone call receiving system 440. These components include Automatic Number Identification ("ANI") 441; Dialed Number Identification Service ("DNIS") information 445; Automatic Call Distributor ("ACD") system 442; Voice Response Unit ("VRU") system 444; private branch exchange ("PBX") switch 446; Voice over Internet Protocol ("VOIP") server 448; and combinations of such devices.

An identified customer can be an inbound caller for which the customer management system 400 has obtained reliable identifying data, including enterprise customer data retrieved from customer database 422. This data can be used by inbound queue management system 402 to retrieve or identify additional data associated with that customer. In an embodiment, an identified customer is a customer for which the system 400 has reliably identified at least one customer group associated with the customer in customer database 422, and at least two of name, address, and zip code. In embodiments in which the customer has been associated over time with two or more customer groups, customer identifying data may include attributions (also herein called attributions data) retrieved by customer database 422, as further described below.

In an embodiment, inbound call management system 402 communicates with a third party directory service 434 such as the WhitePages® online directory service, as described above for inbound telephone call receiving system 140. For an inbound caller that is a new prospect of the enterprise, this additional caller identification information can be stored in customer database 422 as profile data for that prospect.

Inbound telephone calls received through interface 441 are distributed to call queue(s) routing module 450 for response by agents operating telephony devices. In the inbound telephone call receiving system 540 of customer management system 500 shown in FIG. 5, answering queues 550 control routing of inbound callers on hold to live agents. Answering queues module 550 includes a first call queue (hold list) 554 and a second call queue (hold list) 558. First call queue (hold list) 554 routes calls on hold for response by one of the agents in a first pool 560 of call center agents, while second call queue (hold list) 558 routes calls on hold for response by one of the agents in a second pool 570 of call center agents. In an embodiment, call center agents in agent pools 560 and 570 are groups of customer service representatives or agents deployed at workstations or agent devices communicatively coupled to customer management system 500.

Figure 5:
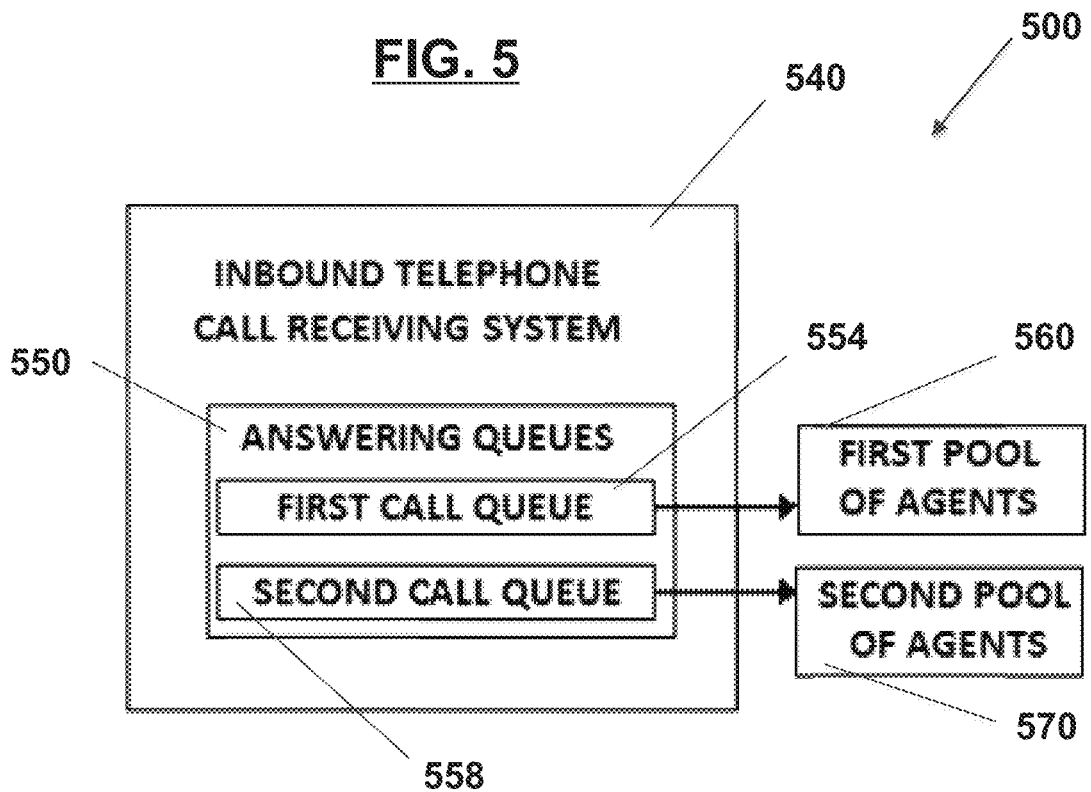
FIG. 5 is a system architecture for an answering queues routing subsystem of a customer management system of an inbound contact center, in accordance with an embodiment.
Figure 6:
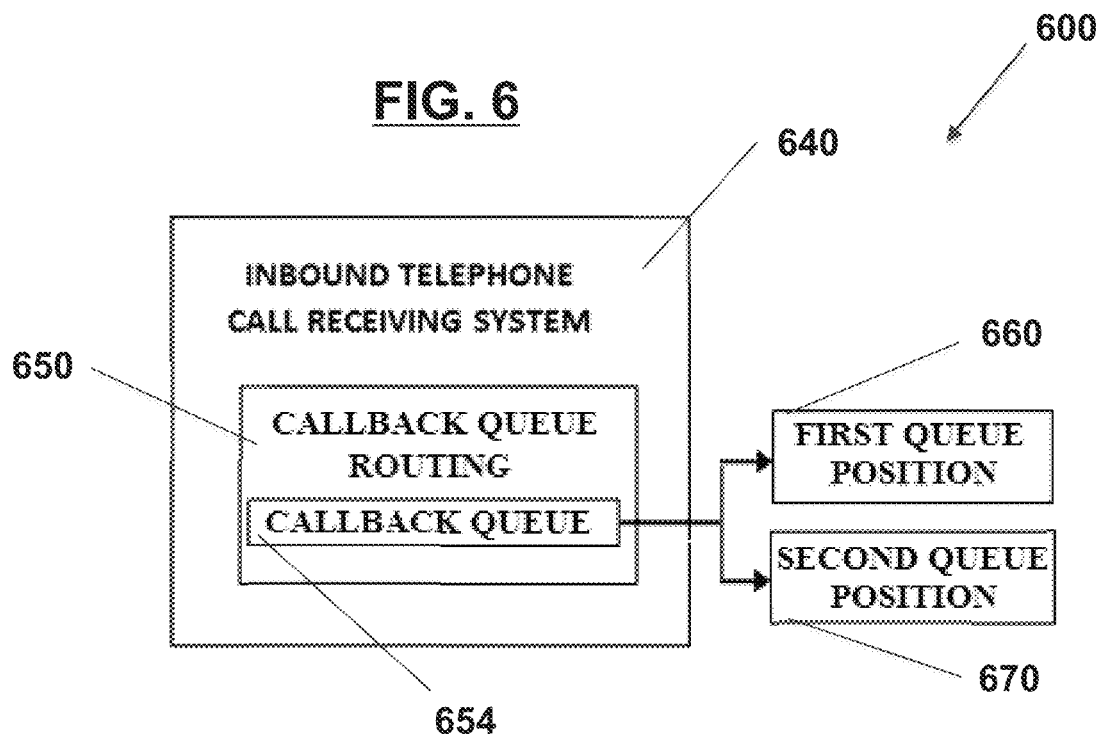
FIG. 6 is a system architecture for a call back queue routing subsystem of a customer management system of an inbound contact center, in accordance with an embodiment.

In the inbound telephone call receiving system 640 of customer management system 600 shown in FIG. 6, call back queue routing module 650 controls call backs to customers by agents of the call center. Call back queue routing module 650 includes a call back queue 654 for controlling call back to the customer by a live agent. Call back queue routing module 650 assigns different customers to different call back queue positions, such as first queue position 660 and second queue position 670. Although FIGS. 5 and 6 depict embodiments of the present invention that order inbound telephone calls, alternative embodiments apply inbound queue management to schedule other types of inbound inquiries, such as e-mail or instant message inquiries.

In an embodiment, agents are associated with a sponsoring organization that sells or supplies products with the assistance of the call center. In an embodiment, the organization generates sales of one or more product through advertisements that give a phone number to prospective customers, and the prospective customers call into the call center using this phone number. In an embodiment of the answering queues system shown in FIG. 5, the agents in first pool 560 are authorized to offer an advertised product to a prospective customer (inbound caller), while the agents in second pool 570 are not authorized to offer the advertised product. In the present disclosure, for an agent to be authorized to offer a product to a prospective customer or lead means that the agent is authorized to pursue a sale of the product to the lead. In this embodiment, placing an inbound caller in the first call queue 554 may be considered a priority queue assignment, while placing the inbound caller in the second call queue 558 may be considered a subordinate queue assignment.

In an embodiment, a sponsoring organization for customer management system 400 is an insurance company or other financial services company, and the agents may include insurance agents. In some cases, an insurance agent may be associated with only a single insurance provider (sometimes referred to as a "captive" insurance agent). In other cases, an "independent" insurance agent may be associated with several different insurance providers. In an embodiment of the system 500, the agents in the first pool 560 are licensed to sell insurance. In some cases, the producers may be licensed to sell different types of insurance products, might have different areas of expertise, needs, etc. In some embodiments, agents in the first pool 560 are selected for performance metrics related to sales. Agent sales performance may be measured by aggregate sales productivity metrics, as well as distributed performance metrics such as sales metrics by product types, etc.

While the agents in second pool 570 are not authorized to offer the product(s) to the inbound caller (prospective customer or lead), these agents perform an important role in lead nurturing. Forwarding an inbound inquiry to a live agent with little or no wait time, sometimes referred to herein as a "warm transfer," has been observed to significantly increase probability of a successful sale to that customer in a later interaction. In some embodiments, agents in the second pool 570 are selected for skills related to agent-customer communications, which can be measured in indicators of customer satisfaction such as feedback on customer experiences.

Figure 7:
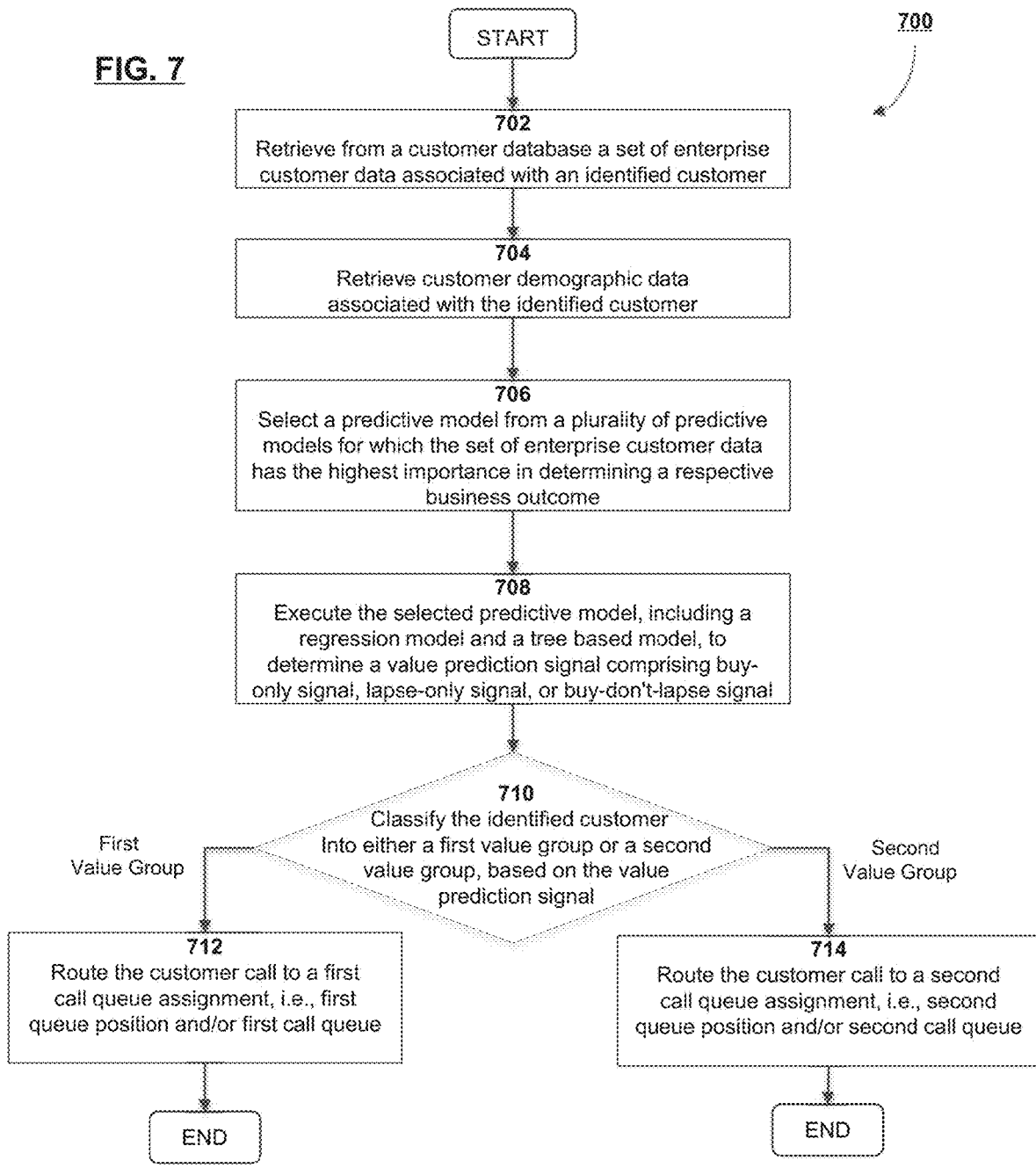
FIG. 7 illustrates a method for routing a customer call to an agent, in accordance with an embodiment.

FIG. 7 is a flowchart of a call management process 700 for automatically routing an inbound call from a customer to one of a plurality of queues (e.g., two queues) based on predicted value of the inbound telephone call. Upon identifying the customer, the process retrieves customer demographic data associated with a customer identifier for the identified customer. A predictive model, including a logistic regression model operating in conjunction with a tree-based model, determines a value prediction signal for the identified customer. Based on the value prediction signal determined, the predictive model classifies the identified customer into one of a first value group and a second value group. In the event the predictive model classifies the identified customer into the first value group, the call management system routes the identified customer to a first call queue for connection to one of a first pool of call center agents who are authorized to present the offer to purchase the product. In the event the predictive model classifies the identified customer into the second value group, the call management system routes the identified customer to a second call queue for connection to one of a second pool of call center agents who are not authorized to present the offer to purchase the product.

The plurality of steps included in process 700 may be performed by one or more computing devices or processors in the customer management system of FIG. 4. In an embodiment, the plurality of steps included in process 700 may be performed by an inbound queue management system 402 of a customer management system 400 of a call center, in operative communication with an inbound call receiving system 440 that receives a customer call of the identified customer.

The call management process 700 is initiated at step 702 in response to the customer management system 400 receiving an incoming customer call associated with a customer identifier. Customers may dial into the system via a public switched telephone network or via intrasite telephony. Additionally, inbound calls may be transmitted via the Internet using Web-enabled browsers, personal digital assistants or other network-enabled devices; via mobile cellular telephones (not shown), which may be Web-enabled, or connected via a mobile switching center.

In an embodiment, the customer identifier includes two or more of name of the identified customer, address of the identified customer, and zip code of the identified customer. In an embodiment, the customer management system obtains a customer identifier for the received customer call from caller information associated with the inbound calls, such as Automatic Number Identification ("ANI") and Dialed Number Identification Service ("DNIS") information. In an embodiment, the customer management system obtains a customer identifier for the received customer call via an automated telegreeter of a Voice Response Unit ("VRU") system. In an embodiment, the customer management system obtains a customer identifier for the received customer call from a third party directory service.

In an embodiment of step 702, the call management process retrieves the third party customer demographic data. In an embodiment, the third party customer demographic data is associated with the customer identifier contained in a third party demographic database. In an embodiment, the call management process builds a simplified data file from the third party demographic data indexed to the customer identifier as input to further steps of the process.

A step 704, the call management process determine via a value prediction signal via a predictive model that includes a logistic regression model and a tree-based model. In various embodiments, the value prediction signal includes one or more of a first signal representative of a likelihood that the identified customer will accept an offer to purchase a product, a second signal representative of a likelihood that the identified customer will lapse in payments for a purchased product, and a third signal representative of a likelihood that the identified customer will accept an offer to purchase the product and will not lapse in payments for the purchased product. In various embodiments, the value prediction signal is a buy-only signal, a lapse-only signal, a buy-don't-lapse signal, or a combination of these signals.

In various embodiments of step 704, the value prediction signal determines a likelihood that the identified customer will lapse in payments for a purchased product by determining a likelihood that the identified customer will fail to make a payment for the purchased product during a predetermined time period following purchase of the purchased product. In an embodiment, the predetermined time period was previously determined by modeling lifetime value over varying durations of the time period following purchase of the purchased product.

In various embodiments of step 704, the regression model employs $l_1$ regularization. In various embodiments, the logistic regression model employs $l_2$ regularization. In various embodiments, the tree-based model is a random forests ensemble learning method for classification.

In an embodiment, the call management process retrieves customer demographic data from a third party demographic database at step 702, and the logistic regression model of step 704 is trained on a full set of features of the third party demographic database.

At step 706, the call management process classifies the customer call (lead) into either a first value group or a second value group, based on the value prediction signal determined at step 704. In an embodiment of step 706, the first value group includes customers having a first set of modeled lifetime values, and the second value group includes customers having a second set of modeled lifetime values. The modeled lifetime values in the first set of modeled lifetime values are higher than modeled lifetime values in the second set of modeled lifetime values.

In the event step 706 classifies the identified customer into the first value group, at step 708 the call management process routes the identified customer to a first call queue for connection to one of a first pool of call center agents who are authorized to present the offer to purchase the product. In the event step 706 classifies the identified customer into the second value group, at step 710 the call management process routes the identified customer to a second call queue for connection to one of a second pool of call center agents who are not authorized to present the offer to purchase the product.

In various embodiments, the agents to which customers are routed at steps 708, 710 are associated with a sponsoring organization that sells or supplies products with the assistance of the call center. In an embodiment, the organization generates sales of one or more product through advertisements that give a phone number to potential or prospective customers, and the potential customers call into the call center using this phone number. In embodiments of step 706 in which the first value group includes leads having modeled lifetime values that are higher than modeled lifetime values of leads in the second value group, steps 708 and 710 prioritize call center resources to pursue sale of offered product(s) to the higher-value group of leads.

In certain embodiments of steps 706, 708, and 710, the classification of leads and routing of leads to the first call queue and second call queue, can permit adjustments to take into account matching of call center resources (agents) to leads at a given time, herein referred to as resource matching adjustments. As seen in the schematic diagram of a customer queue arrangement 300 at FIG. 3, first call queue 302 consists of a queue of length M (last queue position 306), to be connected to agents 310 in a first pool of agents who are authorized to present an offer to purchase the product. Second call queue 304 consists of a queue of length N (last queue position 308), to be connected to agents 312 in a second pool of agents who are not authorized to present an offer to purchase the product.

In various embodiments, resource matching adjustments can including adjustments to the binary classification model that classifies leads into first and second value groups. For example, if there are a disproportionately high number of agents in the first pool 310 compared to the second pool 312, the threshold for the first value group can be reduced to permit routing of additional leads to the first pool of agents. In another example, if there are a disproportionately low number of agents in the first pool 310 compared to the second pool 312, the threshold for the first value group can be raised to permit routing of fewer leads to the first pool of agents.

In various embodiments, resource matching adjustments can include adjustments to the first queue of leads and second queue of leads. Such adjustments may take into account the total population of leads awaiting connection to call center agents, i.e., the leads in both queues 302 and 304 at a given time. At certain times there may be an unusual distribution of leads between the first and second queues, e.g., a disproportionately high number of leads in the first queue (M is unusually high relative to N) or a disproportionately low number of leads in the first queue (M is unusually low relative to N). To address these unusual distributions, one or more customer may be shifted from the first queue 302 to the second queue 304, or one or more customer may be shifted from the second queue 304 to the first queue 302.

Both types of resource matching adjustment, i.e., adjustment of the binary classification model, and direct adjustment of the call queues, may be combined.

Figure 8:
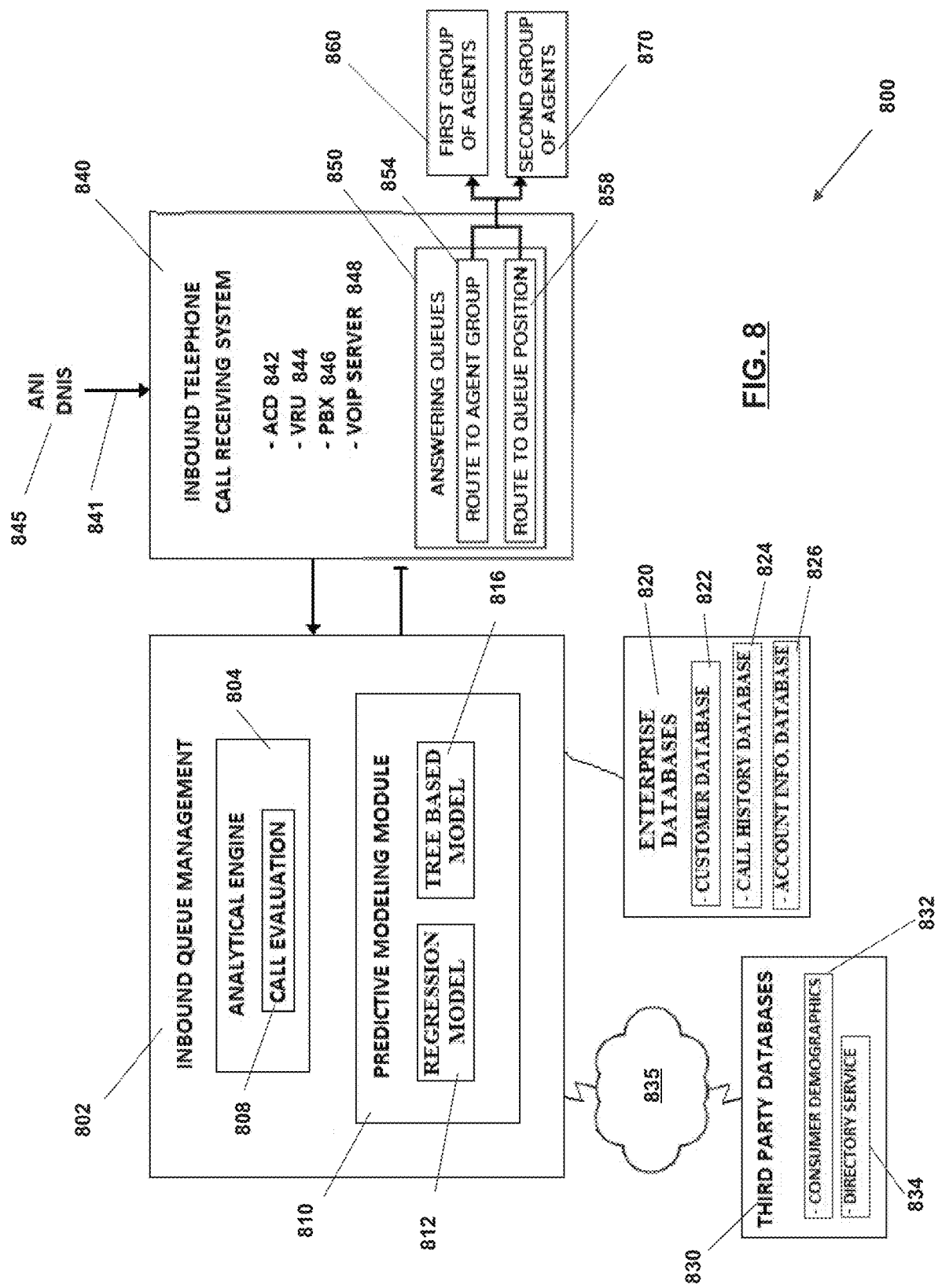
FIG. 8 is a system architecture for a customer management system of a contact center, in accordance with an embodiment.

FIG. 8 shows a system architecture for a customer management system 800 of a contact center, also herein called a call center, according to an illustrative embodiment. In the present disclosure, the call center is sometimes called an inbound call center or inbound contact center, referring to its primary function of receiving inbound customer calls. The components and functions of customer management system 800 are generally similar to those of customer management system of FIG. 4, and reference should be had to discussion of the system 400 above for a description of corresponding components and functions. Customer management system 800 includes an inbound queue management system 802, also called an inbound call management system. The inbound queue management system 802 may be hosted on one or more computers (or servers), and the at least one computer may include or be communicatively coupled to one or more databases. Inbound queue management system 802 manages assignment of inbound telephone calls for response by agents in a queue position of a call queue for connection to a group of call center agents selected from a plurality of groups of call center agents. The group of call center agents is selected based on enterprise customer data for the caller (identified customer), while the queue position is selected based on predicted value of the inbound telephone call.

Predictive modeling module 810 models behaviors of customers such as likelihood that a caller will purchase a product offered by the call center and likelihood that the caller will lapse in payments for a purchased product. The predictive modeling module analyzes each inbound customer call using data associated with a customer identifier for the inbound caller. This customer identifier may be obtained from various sources by the call evaluation submodule 808, including enterprise customer data retrieved from customer database 822. Input data used in predictive modeling includes data retrieved from customer database 822 and may include data from other internal databases 820. Additionally, input data used in predictive modeling includes data from third-party databases 830. This input data also may include data derived from the retrieved data that has been transformed by analytical engine 804 in order to facilitate predictive modeling, as described herein.

Analytical engine 804 stores customer care interaction data representing attributes of one or more predetermined customer care interactions implemented by each group of agents within a plurality of groups 860 and 870 of call center agents. Attributes of customer care interactions may include, for example, general areas of responsibility, specific areas of responsibility, primary agent skills, secondary agent skills, target customer groups, associated products, associated marketing campaigns, etc. As part of the process for routing a given inbound caller (identified customer) to call center agents, analytical engine 804 compares the stored customer care data with a set of enterprise customer data retrieved for that customer. Analytical engine 804 selects one of the plurality of groups of agents 860 and 870 based upon consistency of the predetermined customer care interaction for the selected group of agents with the set of enterprise customer data retrieved for the identified customer.

Predictive modeling module 810 generates a value prediction signal representative of one or more of the following customer behaviors: (a) likelihood that the customer will accept an offer to purchase a product, (b) likelihood that the customer will lapse in payments for a purchased product, and (c) likelihood that the customer will accept an offer to purchase the product and will not lapse in payments for the purchased product. In certain embodiments, the predictive modeling module can predict more than one of these customer behaviors. For example, the predictive model may first determine the customer behavior (a) likelihood that the customer will accept an offer to purchase a product, followed by determining the customer behavior (b) likelihood that the customer will lapse in payments for a purchased product, in order to determine a value prediction signal.

Based on this value prediction signal, the analytical module, in conjunction with the predictive modeling module, classifies each customer call into one of two, or more, value groups.

Depending on the group of agents selected and the value group determined for each customer call, analytical engine 804 directs routing of the customer call to answering queues module 850 to await connection to an agent of the call center. Answering queues module 850 includes a component 854 that routes the inbound call to a call queue for a given group of agents from a plurality of groups of agents, and a component 858 that assigns the inbound caller to a selected queue position in the selected call queue for live connection to an agent from the given group of agents. In FIG. 8, two groups of call center agents with respective call queues—first agent group/call queue 860 and second agent group/call queue 870—are shown. Routing inbound calls based on analysis of customer care interactions and of call value represents a significant improvement over traditional methods of routing callers, such as "round-robin" caller routing.

An identified customer can be an inbound caller for which the customer management system 800 has obtained reliable identifying data, including enterprise customer data retrieved from customer database 822. This data can be used by inbound queue management system 802 to retrieve or identify additional data associated with that customer. In an embodiment, an identified customer is a customer for which the system 800 has reliably identified at least one customer group associated with the customer in customer database 822, and at least two of name, address, and zip code. In embodiments in which the customer has been associated over time with two or more customer groups, customer identifying data may include attributions (also herein called attributions data) retrieved by customer database 822, as further described below.

In an embodiment, a sponsoring organization for customer management system 800 is an insurance company or other financial services company, and the agents may include insurance agents. In some cases, an insurance agent may be associated with only a single insurance provider (sometimes referred to as a "captive" insurance agent). In other cases, an "independent" insurance agent may be associated with several different insurance providers. In an embodiment of the system 800, the agents in the first group 860 are licensed to sell insurance. In some cases, the producers may be licensed to sell different types of insurance products, might have different areas of expertise, needs, etc. In some embodiments, agents in the first group 860 are selected for performance metrics related to sales. Agent sales performance may be measured by aggregate sales productivity metrics, as well as distributed performance metrics such as sales metrics by product types, etc.

In an embodiment the agents in the second group 870 are not authorized to offer the product(s) to the inbound caller (prospective customer or lead), but these agents are authorized to screen leads for prospective customers. Such agents perform an important role in lead nurturing. Forwarding an inbound inquiry to a live agent with little or no wait time, sometimes referred to herein as a "warm transfer," has been observed to significantly increase probability of a successful sale to that customer in a later interaction. In some embodiments, agents in the second group 870 are selected for skills related to agent-customer communications, which can be measured in indicators of customer satisfaction such as feedback on customer experiences.

Figure 9:
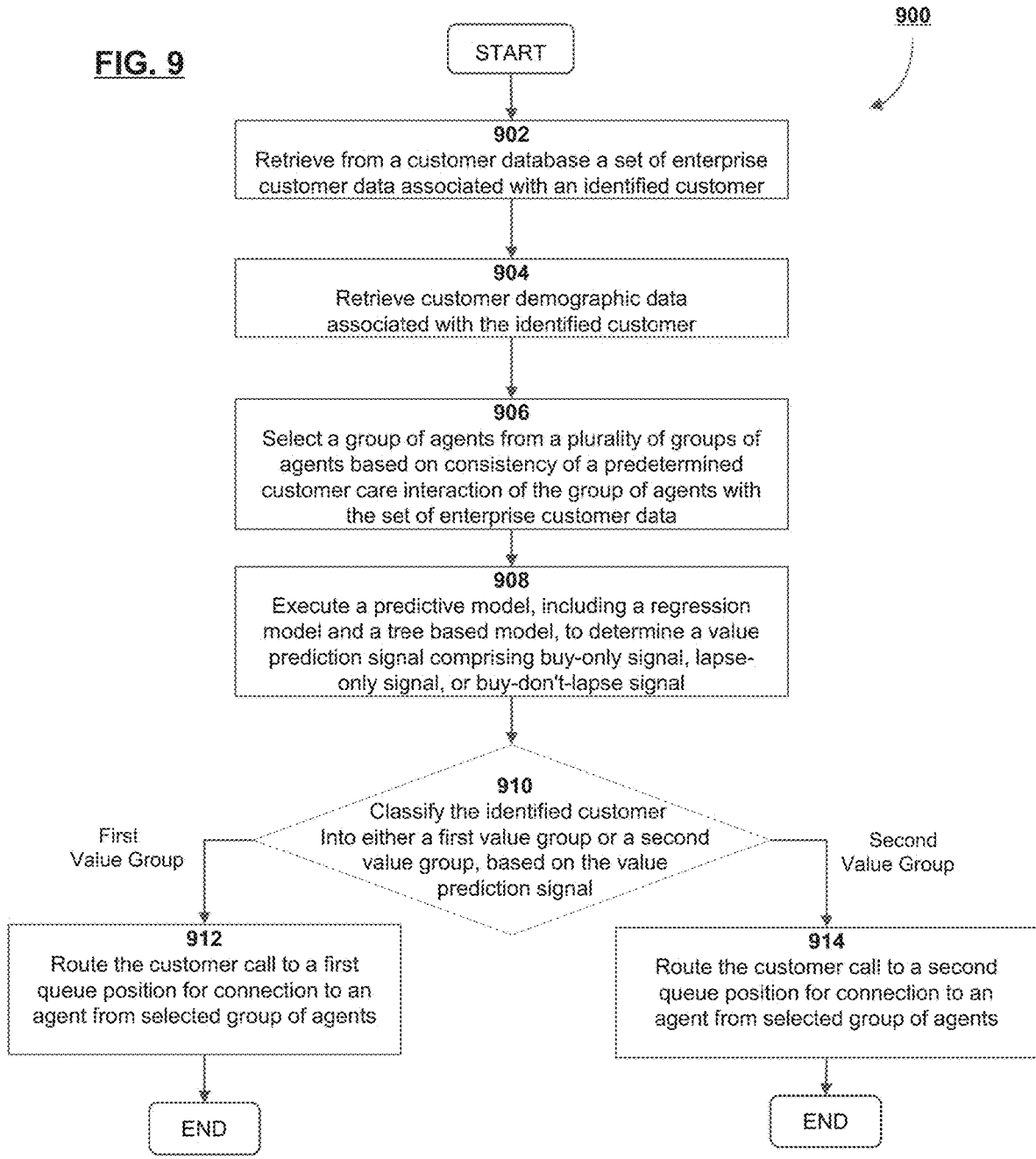
FIG. 9 illustrates a method for routing a customer call to an agent, in accordance with an embodiment.

FIG. 9 is a flowchart of a call management process 900 for automatically routing an inbound call from an identified customer to a queue position within a call queue to be connected to a one of a plurality of call center agents. The selected group of agents implements a predetermined customer care interaction and is selected based upon consistency of the predetermined customer care interaction with enterprise data pertaining to the identified customer. The inbound call's queue position within the call queue for connection to the selected group of call center agents is based on a predicted value of the inbound telephone call.

The method 900 retrieves from a customer database a set of enterprise customer data associated with an identified customer in a customer call. The customer database stores enterprise customer data associated with prospects, leads, and purchasers of an enterprise. In certain embodiments, the customer database also stores enterprise customer data associated with new business applicants of the customer enterprise. The method additionally retrieves customer demographic data associated with the identified customer.

The method 900 selects a group of agents from a plurality of groups of agents of the call center, wherein the selected group of agents implements a predetermined customer care interaction of the call center. The group of agents is selected based upon consistency of the predetermined customer care interaction with the set of enterprise customer data for the identified customer.

A predictive model, including a logistic regression model operating in conjunction with a tree-based model, determines a value prediction signal for the identified customer. Based on the value prediction signal determined, the predictive model classifies the identified customer into one of a first value group, and a second value group. When the predictive model classifies the identified customer into the first value group, the call management system routes the customer call for the identified customer to a first call queue position for connection to an agent from the selected group of agents. When the predictive model classifies the identified customer into the second value group, the call management system routes the customer call for the identified customer to a second call queue position for connection to an agent from the selected group of agents.

The steps of process 900 may be performed by one or more computing devices or processors in the customer management system of FIG. 8. In an embodiment, the plurality of steps included in process 900 may be performed by an inbound queue management system 802 of a customer management system 800 of a call center, in operative communication with an inbound call-receiving system 840 that receives a customer call of the identified customer.

The call management process 900 is initiated at step 902 in response to the customer management system 800 receiving an incoming customer call, by retrieving from a customer database enterprise customer data associated with an identified customer in the customer call. The customer database stores enterprise customer data associated with prospects, leads, and purchasers of an enterprise. In various embodiments, the enterprise customer data used in selecting the selected predictive model comprises one or more of customer event data, activity event data, and attributions data. In certain embodiments, the customer database also stores enterprise customer data associated with new business applicants of the enterprise.

At step 904, the call management process retrieves customer demographic data associated with the identified customer. In an embodiment, the process retrieves the customer demographic data from a third-party database. In an embodiment, the third-party customer demographic data is associated with identified customer by matching the data to one or more enterprise customer identifiers stored by the customer database. In an embodiment, the call management process builds a simplified data file from the retrieved third-party demographic data as input to further steps of the process.

At step 906, the method selects a group of agents from a plurality of groups of agents of the call center, wherein the selected group of agents implements a predetermined customer care interaction of the call center. The group of agents is selected based upon consistency of the predetermined customer care interaction with the set of enterprise customer data retrieved from the customer database at step 902.

In an embodiment of step 906, a first predictive model from the plurality of predictive models is selected if the enterprise customer data satisfies predetermined model selection criteria, and a second predictive model from the plurality of predictive models is selected if the enterprise customer data does not satisfy the predetermined model selection criteria. In another embodiment of step 906, the selected predictive model is selected from three or more predictive models.

In various embodiments of step 906, the group of agents is selected based upon enterprise customer data for the inbound caller including one or more of customer event data, activity event data, and attributions data. In an embodiment, the group of agents is selected to increase the likelihood of achieving one or more predetermined customer care interaction based upon consistency with the enterprise customer data for that group of agents.

In an illustrative embodiment of step 906, the predetermined customer care interaction is customer development of leads, and the set of enterprise customer data includes customer event data associated with a prospect. In another example, the predetermined customer care interaction is cross-selling of products, and the set of enterprise customer data includes customer event data associated with a purchaser, and activity event data indicating likelihood of an additional purchase. In another example, the predetermined customer care interaction is promoting a given product, and the set of enterprise customer data includes activity event data indicating customer interest in a marketing campaign for the given product. In a further example, the predetermined customer care interaction is closing product sales, and the set of enterprise customer data includes one or more of customer event data associated with a prospect, customer event data associated with a new business applicant, and attributions data associated with a prospect and a new business applicant.

At step 908, the call management process executes a predictive model to determine a value prediction signal. In an embodiment, the predictive model applies a logistic regression model in conjunction with a tree-based model to the retrieved customer demographic data. In an embodiment, the call management process executes the predictive model to determine the value prediction signal in real time. By determining the value prediction signal in real time, the present method expeditiously routes an incoming customer call to a call queue for connection to an agent from a selected group of call center agents.

In various embodiments of step 908, the value prediction signal includes one or more of a first signal representative of a likelihood that the identified customer will accept an offer to purchase a product, a second signal representative of a likelihood that the identified customer will lapse in payments for a purchased product, and a third signal representative of a likelihood that the identified customer will accept an offer to purchase the product and will not lapse in payments for the purchased product.

In various embodiments of step 908, the value prediction signal determines a likelihood that the identified customer will lapse in payments for a purchased product by determining a likelihood that the identified customer will fail to make a payment for the purchased product during a predetermined time period following purchase of the purchased product. In an embodiment, the predetermined time period was previously determined by modeling lifetime value over varying durations of the time period following purchase of the purchased product.

In various embodiments of step 908, the regression model employs $l_1$ regularization. In various embodiments, the logistic regression model employs $l_2$ regularization. In various embodiments, the tree-based model is a random forests ensemble learning method for classification.

At step 910, the call management process classifies the customer call for the identified customer into either a first value group or a second value group, based on the value prediction signal determined at step 908. In an embodiment of step 910, the first value group includes customers having a first set of modeled lifetime values, and the second value group includes customers having a second set of modeled lifetime values. The modeled lifetime values in the first set of modeled lifetime values are higher than modeled lifetime values in the second set of modeled lifetime values.

When step 910 classifies the identified customer into the first value group, at step 912 the call management process routes the customer call for the identified customer to a first call queue position for connection to an agent from the selected group of agents. When step 910 classifies the identified customer into the second value group, at step 914 the call management process routes the customer call for the identified customer to a second call queue position for connection to an agent from the selected group of agents.

In an embodiment of steps 912, 914, the call queues are hold lists for callers on hold. In another embodiment, the call queues are call-back queues.

In embodiments of step 910 in which the first value group includes customers having modeled lifetime values that are higher than modeled lifetime values of customers in the second value group, steps 912 and 914 prioritize call center resources to the higher-value group of customers.

Figure 3:
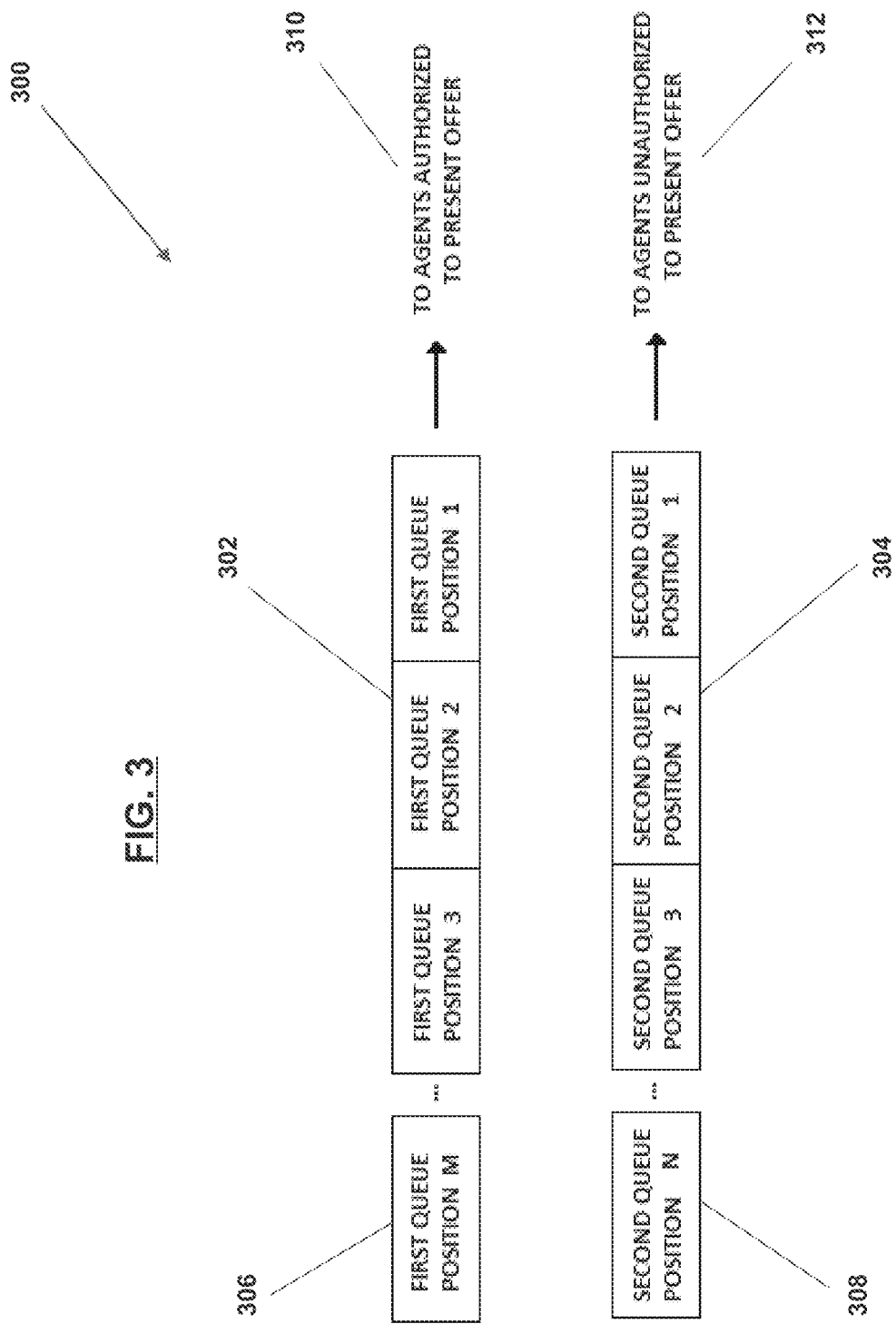
FIG. 3 illustrates a queue arrangement for routing prospective customers to agents of a call center, in accordance with an embodiment.

As seen in the schematic diagram of a customer queue arrangement 300 at FIG. 3, first call queue 302 consists of a queue of length M (last queue position 306), to be connected to agents 310 in a first group of agents who are assigned to implement a first predetermined customer care interaction. Second call queue 304 consists of a queue of length N (last queue position 308), to be connected to agents 312 in a second group of agents who are assigned to implement a second predetermined customer care interaction In an embodiment, steps 912 and 914 provide normal (FIFO) queuing for callers within a given value group, and assign priority queue positions to one value group and subordinate queue positions to another value group. In various embodiments, the first queue position is located behind other callers who were previously assigned a first queue position in that call queue, and the second queue position is located behind the queue position of other callers who were previously assigned a second queue position in that call queue. For example, in first call queue 302, if the most recent prior assignment of a first queue position was to queue position M, the current assignment of a first queue position could be to a new queue position M+1 (not shown). If the most recent prior assignment of a second queue position was to queue position 3, the current assignment of a second queue position could be to insert the current inbound caller into queue position 4, and to adjust the prior caller at queue position 4 to queue position 5, adjust the prior caller at queue position 5 to queue position 6, etc.

In an embodiment of steps 912, 914, the longest-waiting callers on hold in the subordinate value group may have a more advanced position in the queue than the shortest-waiting callers on hold in the priority value group. In an example of this arrangement, the first queue position is the subordinate queue position and the second queue position is the priority queue position. At step 914, the method assigns a second queue position to a current inbound caller that is behind the most recently assigned second queue position, and is behind any callers previously assigned a first queue position who have waited more than a predetermined period of time for connection to an agent.

Figure 10:
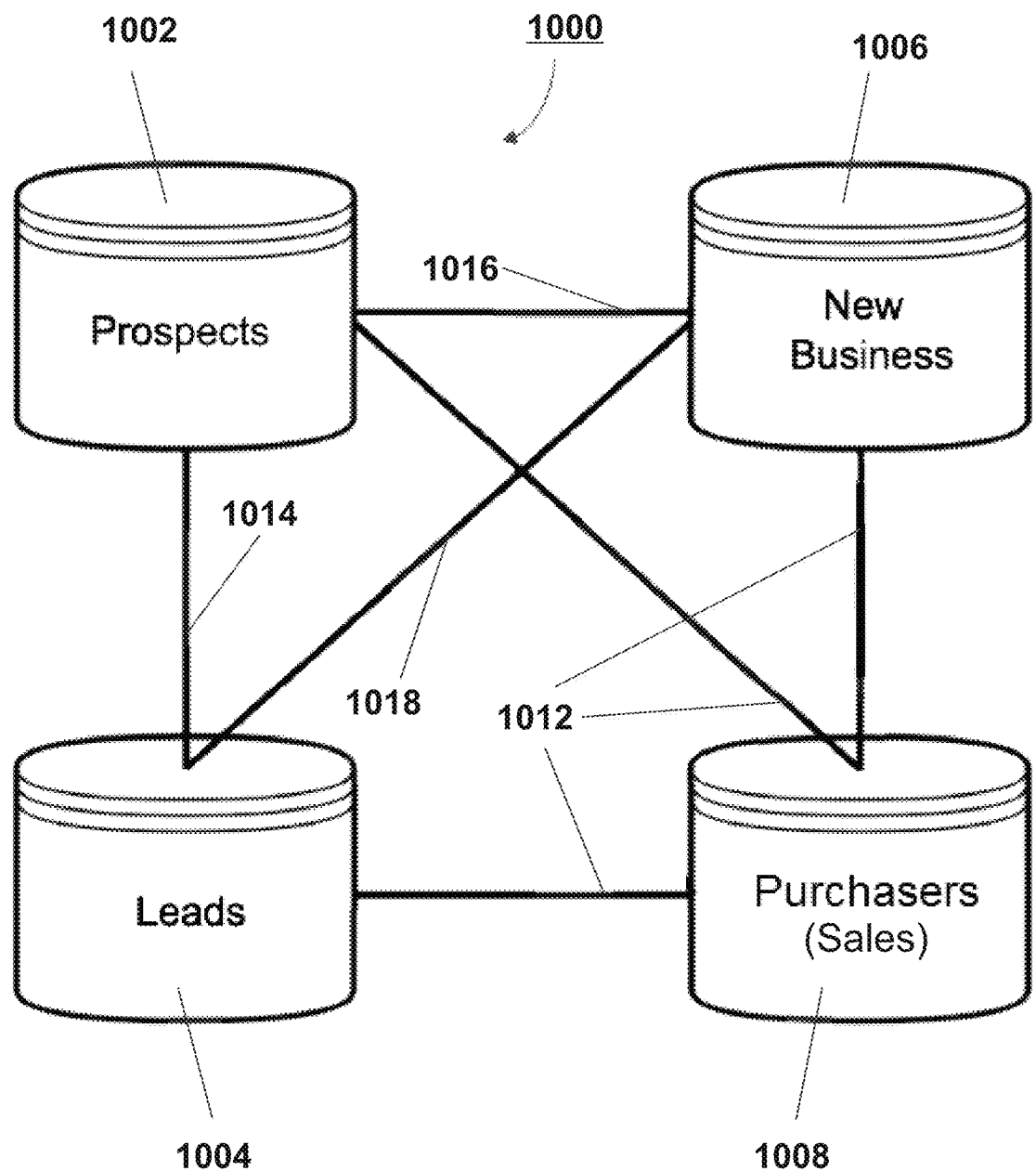
FIG. 10 is an architecture for a customer database including data stores for four target groups for marketing and customer acquisition of the enterprise, in accordance with an embodiment.

FIG. 10 is an architecture of a customer database 1000, representing an embodiment of the customer database 422 of FIG. 4 and of the customer database 822 of FIG. 8. Customer database 1000 is an internal database of the sponsoring organization of the call center, or other enterprise. Customer database 1000 stores information on individual customers of the enterprise, associating these customers with one or more of the groups Prospects 1002, Leads 1004, New Business 1006 and Purchasers (Sales) 1008. In the present disclosure, customer database records that identify individual customers of the enterprise, such as by name and phone number, are sometimes called "enterprise customer records." Customer database 1000 includes links between each customer group and each of the other groups. These links between customer groups are sometimes herein called attributions. There are unique keys 1012 between Purchasers (Sales) and each of the other data stores; a unique key 1014 between Prospects 1002 and Leads 1004; a unique key 1016 between Prospects 1002 and New Business 1006; and a unique key 1018 between Leads 1004 and New Business 1006. In addition, customer database 1000 tracks event data for customer-related activities, such as promotional activities, customer prospecting activities, and call center CRM activities. Customer database 1000 joins customer information across these four groups, as well as attributions and events data, in order to better evaluate marketing and call center activities, build stronger models, and generate useful reports.

In the embodiment of FIGS. 4, enterprise customer data from customer database 1000 is used in conjunction with customer data from third party data sources 430, such as customer demographic data 432 and directory services data 434 based on phone number, to score incoming customers. This use case may also apply to the embodiments of FIG. 1 and FIG. 8.

Customer database 1000 employs attribution processes for tracking customers across events in customer acquisition and marketing. The objective of attribution is to track people across events: i.e., prospects, leads, applications, and sales. Customer database 1000 uses exact matching of personal details in order to determine which prospects may have become leads, submitted new business applications, and/or bought products; and which leads may have submitted new business applications and/or bought products. In an embodiment, customer database 1000 additionally employs matching algorithms for matching personal details with leads data retrieved from third party demographic databases.

Figure 11:
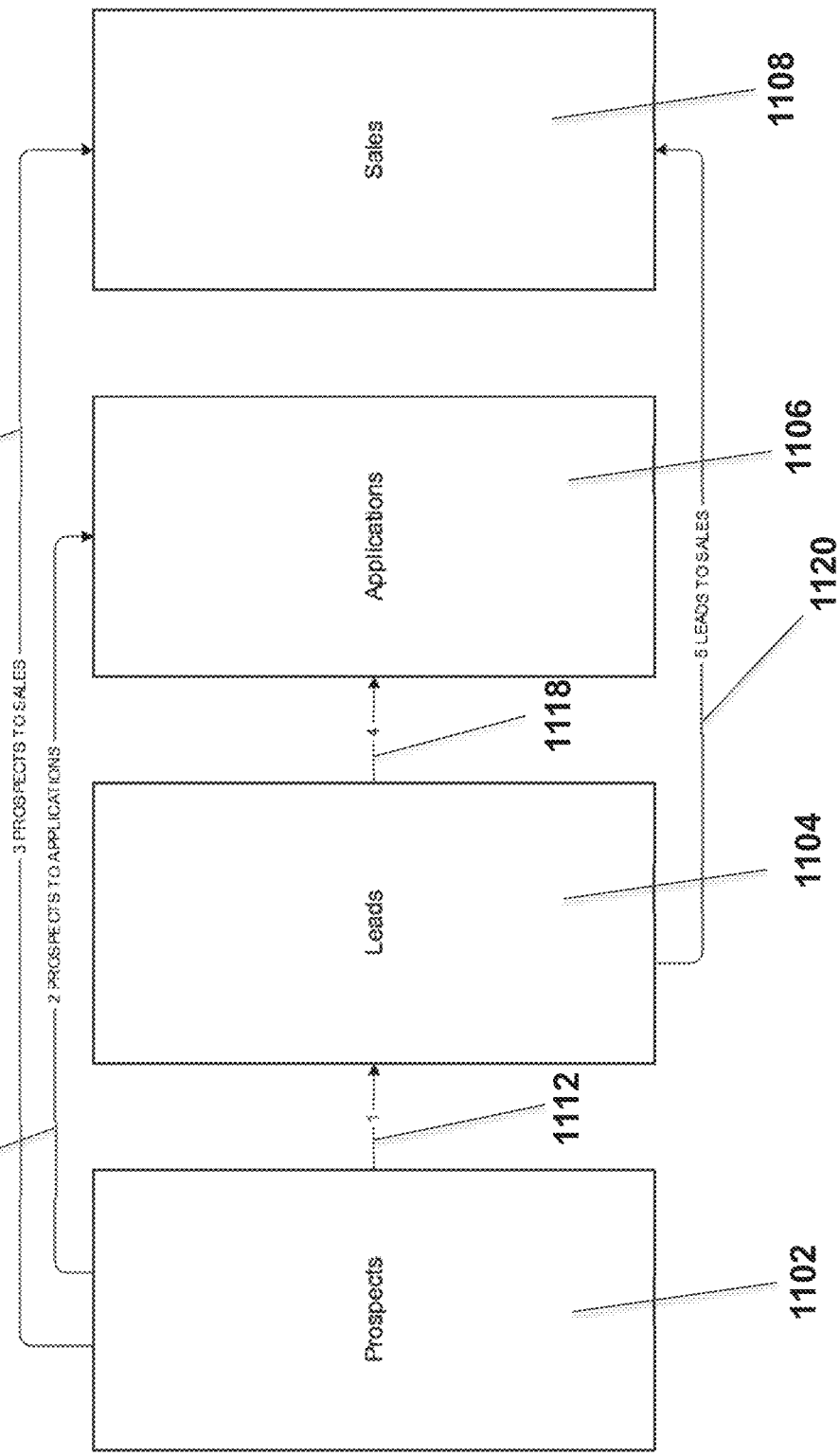
FIG. 11 is a flow chart diagram of attribution processes for tracking persons across events between customer groups (prospects, leads, new business applicants, and sales), in accordance with an embodiment.

The flow chart diagram of FIG. 11 shows attribution processes for tracking persons across events between the customer groups. FIG. 11 shows four customer groups, herein sometimes called "customer event" data: prospects 1102, leads 1104, applications 1106, and sales 1108. An individual customer can follow several different paths. For example, the customer might be a prospect who goes straight to a sale; might go through the leads pipeline; might submit an application but never buy the product, etc. Events also can include activity events, such as promotional activities, customer prospecting activities, and call center CRM activities. In the present disclosure, customer database data tracking such activity events are sometimes called "activity event" data.

In an embodiment, events tracked by customer database 1100 include pairs of events consisting of an event that occurs earlier in time (also herein called prior event; e.g., event A) and an event that occurs later in time (also herein called subsequent event; e.g., event B). Attributions, also called "attributions data" in the present disclosure, serve two primary functions. The first function is to trace all instances of a prior event A to see where these instances ended up. An example of this function is: "Find all leads, applications, and sales that resulted from prospecting activity on X date." The second function is to determine, for any record of a subsequent event B, which instance of event A most likely caused event B. An example of this function is: "Which prospecting activities were responsible for TERM product sales this month?"

Each arrow of FIG. 11 represents one of five attribution processes 1112, 1114, 1116, 1118, and 1120. The illustrated embodiment does not include an attribution between applications and sales, because tracking between them is very simple. In another embodiment, the attributions would include an attribution between applications and sales. Each arrow is numbered (1, 2, 3, 4, or 5), representing the order in which these attribution processes are run. In an embodiment, each attribution process carries out the following steps, in order: (1) Match records between event A and event B, where event B occurs later in time. For example, in the prospect to leads attribution 1112, prospect is event A and leads is event B; (2) Filter matches based on a time limit determined by business rules; (3) Determine the best match, i.e., the single record from event A that most likely led to each record from event B; and (4) Load unique best matches to the attribution table, updating the historical table.

Figure 12:
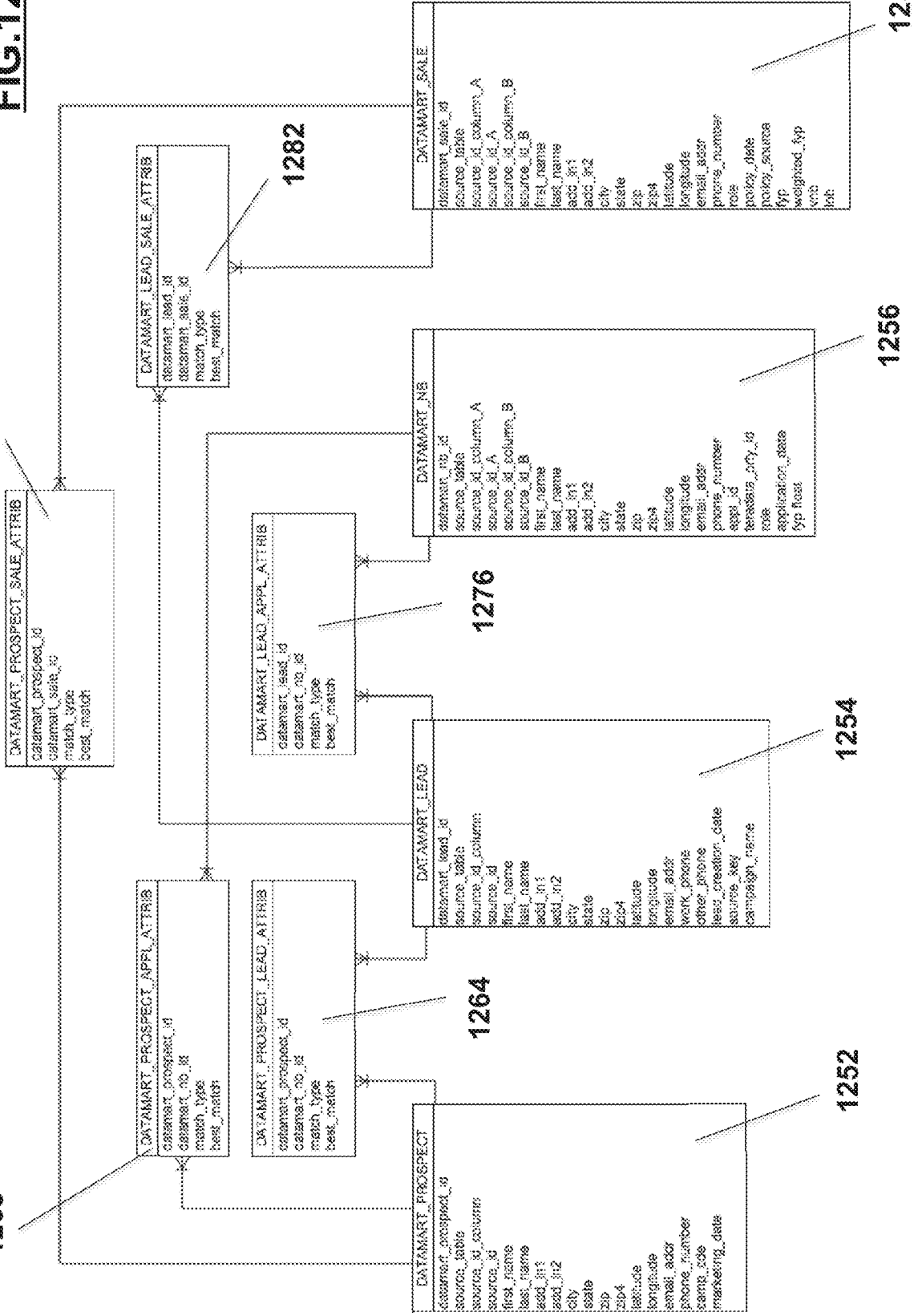
FIG. 12 is a schematic diagram of customer database event tables for customer groups' prospect, lead, new business, and sale, and of tables for attribution between events, in accordance with an embodiment.

FIG. 12 is a schematic diagram of customer database event tables for the customer groups prospect, lead, new business, and sale; and of attribution tables between events. Customer database event tables pool all prospects, leads, applications, and sales across the enterprise into four standardized tables 1252, 1254, 1256, 1258. In an embodiment, prospect events data include, e.g., camp_cde (code of the marketing campaign that targeted the prospect) and marketing_date (earliest known date for the prospect). In an embodiment, leads events data include, e.g., lead_creation_date (earliest known date for the lead) and source_key (data that identifies the lead's corresponding prospect, where applicable). In an embodiment, new business events data include, e.g., role (role of the person in the record has on an insurance policy, such as owner, insured, or payer) and fyp (first year premium). In an embodiment, sale events data includes, e.g., policy_date (earliest known date for the policy) and vnb (value of new business).

In an embodiment of the system of FIG. 4, various data in customer database 422 are also stored in other internal databases 420 of the enterprise, such as call history database 424 and account information database 426. The latter databases may act as source systems for customer database 422. Referring again to FIG. 12, customer database records may have values in the columns source_table, source_id_column, and source_id, indicating how to access information in the source system.

Attribution creates attribution tables by applying rules to the customer database event tables. The attribution tables 1264, 1268, 1272, 1276, and 1282 of FIG. 12 provide the basic data representing the relationship between each pair of events 1252, 1254, 1256, 1258. In addition, the customer database 1200 can build overall tables that aggregate all the relationships between prospect, lead, new business, and sales. For example, if a prospect is attributed to a lead, which in turn is attributed to a sale, an overall table would represent these relationships in a single row. In various embodiments, customer database builds reports via overall tables that apply analytics to select data using one or more of attribution tables 1264, 1268, 1272, 1276, and 1282. In various embodiments, the analytics include criteria based on activity events.

In an example, the customer database 1200 builds a report to answer the question: "What is the response rate for the Term to Perm campaign?" The customer database selects data using the marketing.datamart_prospect_lead_attrib table 1264. The customer database applies analytics to focus on the Term to Perm marketing campaign, counting the number of leads generated from the total prospects. In another example, the customer database 1200 builds a report to answer the question: "What is the conversion rate for the Retirement campaign?" The customer database selects data using the marketing.datamart_prospect_appl_attrib table 1268. The customer database applies analytics to focus on the Retirement marketing campaign, counting the percentage of applications generated from the total prospects.

The following discussion refers to customer management system 400 and its components, but also applies to customer management system 100 and customer management system 800. In an illustrative embodiment, customer management system 400 utilizes data from both internal and external sources in pre-sale predictive modeling of sale of a financial product (insurance policy). The data includes internal data 420 of the call center that tracks historical information about leads, customers, and marketing costs of the call center, including historical sales and lapse information. In an embodiment, these internal databases use rmm_analytics schema in data warehouse software. In an embodiment, internal databases 420 use rmm_analytics schema to generate a table of enterprise customer data. In another embodiment, internal databases 420 use rmm_analytics schema to generate additional data tables, such as a table of historical lead and customer data, and a table of marketing costs data.

In an embodiment, rmm_analytics schema includes sales and lapse data for current and/or historical leads of the enterprise, which data is used in building predictive models of the present disclosure. In an illustrative embodiment, a paid_flag indicates policy payments and a related field shows the amount of each payment. In the present disclosure, these data are called payment data. In an illustrative embodiment, either a lapse_flag or surrendered_flag indicate that a policy has lapsed. In the present disclosure, these data are referred to as lapse data. In an embodiment, date fields are used for filtering data by date range. In an illustrative embodiment, information about leads, customers, and marketing costs was used to model a pre-determined period of time of payments following the sale of the product that defines lapse. In an illustrative embodiment, for the purpose of pre-sale predictive modeling of sale of an insurance policy, this modeling resulted in defining lapse as failure of the customer to maintain a purchased policy in force for at least 18 months.

In building the predictive models of the present disclosure, model datasets may have populations in the hundreds of thousands or millions of individuals. Model datasets may include training datasets and testing datasets. Filtering techniques can be applied to eliminate false data and for de-duplicating, reducing the number of records but significantly improving quality of model datasets. In an illustrative embodiment, date-filtered data such as payment data and lapse data within an older date range are used for building a training data set, and date-filtered data within a more recent range are used for building a test data set. In an illustrative embodiment, predictive machine-learning models of the present disclosure are continually trained using updated payment data, lapse data, and customer demographic data.

In an embodiment, in building predictive models, rmm_analytics schema are filtered based on the flow of historical leads through the inbound call center routing process. In an embodiment, the data are filtered to select only historical leads that were connected to a live agent; in the present disclosure this flow is sometimes called a "warm transfer." Applicant has observed that building predictive models based on a population limited to warm transfers can improve performance of models for predicting sales and lapse behaviors.

In the illustrative embodiment, data used in predictive modeling also include data retrieved from the customer demographic database 432 to obtain information about customers. In an embodiment, customer demographic data includes individual level data on customers. In various embodiments, as a prerequisite to using data in predictive modeling of a given inbound caller (customer), analytical engine 404 associates the customer demographic data with a customer identifier for the customer. In an illustrative embodiment, customer demographic data used in modeling of a customer requires an exact match of name and address.

In an embodiment, customer demographic data also includes data using zip-level features of the system, which provides a coarser representation in building the predictive model. Such zip-level features employ variables that have resolution at the zip-level for each individual in the zip code. In an illustrative embodiment, zip-level data for individual income is associated with a median value of income for each individual in the zip code. Reasons for using zip-level data in predictive modeling include, for example, lack of a statistically significant difference in model performance as a function of any polymr match score threshold; simplicity of collecting only the name and zip code in the telegreeter process; and privacy considerations as to individual-level data.

In various embodiments embodiment, in predictive modeling of inbound callers, inbound queue management system 402 uses a fast-lookup tool (e.g., polymr) that analyzes customer identifiers of inbound callers in real time to retrieve customer data, such as customer demographic data, matched to the customer identifiers. In an embodiment, the polymr fast-lookup tool is a lightweight, extensible search engine, or API, implemented in the Python object-oriented programming language, https://www.python.org/. In various embodiments, the polymr tool performs real time matching of data in the customer demographic database 432 to a customer identifier for a given lead. In various embodiments, as a preliminary to using data in real-time predictive modeling of inbound callers, inbound queue management system 402 indexes the data by applying the search engine to customer identifiers in customer training data, and stores this index as an internal enterprise database 420.

In an embodiment, inbound queue management system 402 labels each data element in Acxiom as continuous (including interval), binary, ordinal, or nominal (categorical). For use in a logistic regression model 414, variables that have lookup fields are converted to integers. Following feature transformation of the variables, the final view outputs each variable with human-readable names (if known), and a tag at the end of the variable name. Illustrative end tags for transformed variable names include:

_binary: either 0 or 1
_ordinal_to_binary: either 0 or 1, where null values are mapped to 0
_flat_binary: mapped from a string field like "01001000" into multiple fields
_ordinal: as an integer, with null values left null
_interval: as an integer, with null values left null
_continuous: as an integer, with null values left null
_nominal: as an integer, with null values mapped to an additional integer By applying the feature transformation rules described above, analytical engine 404 builds a simplified input data file from data retrieved. This simplified input data file facilitates predictive modeling with a binary target.

Predictive modeling module 410 builds both a regression model 414 and a tree-based model 418. In an embodiment, the predictive modeling module 410 trains a logistic regression model 414 with $l_1$ regularization on the full set of features of the Acxiom database. Use of logistic regression for classification problems provides performance advantages over standard linear regression, because application of the logistic function to the raw model score maps the output precisely from $0 \rightarrow 1$ while providing a smooth decision boundary. In an embodiment, the logistic regression model with $l_1$ regularization utilizes LASSO (Least Absolute Shrinkage and Selection Operator), a regression analysis method that performs both variable selection and regularization to enhance prediction accuracy and ease of interpretation of the resulting statistical model.

$l_1$ regularization provides the benefit of simplifying the selection of features through the model training process by constraining features with lower correlation to have 0 weight. The general form for a linear model can be indicated as:

$$\hat{y}(w,x) = w_o + w_1 x_1 + \ldots + w_p x_p$$

for $\hat{y}$ to be predicted from data points in the array x by learned coefficients w. The $l_1$ regularization is achieved by adding a term to the cost function, as follows:

$$\min_w \frac{1}{2n_{samples}} \|Xw - y\|_2^2 + a\|w\|_1$$

with regularization weight α. Applicant observed in training a logistic regression model with $l_1$ regularization, that run time of training increases rapidly with greater regularization parameters, with best model performance at low values of the regularization parameter α. In an embodiment, the logistic regression model with $l_1$ regularization sets the regularization parameter α using cross-validation, with best-performing values typically around 0.005-0.01.

In another embodiment, regression model employs logistic regression with $l_2$ regularization, sometimes called ridge regression, according to the formula:

$$\min_{w} \frac{1}{2n_{samples}} \|Xw - y\|_2^2 + a\|w\|_2$$

In the $l_2$ regularization model, as in the $l_1$ regularization model, the regularization weight α is set by cross validation. In an embodiment, a logistic regression model with $l_2$ regularization uses a backward feature selection procedure to select an optimal number of features. This feature selection procedure is the RFECV method for recursive feature elimination in Scikit-learn, a software machine-learning library for the Python programming language, available at https://github.com/scikit-learn/scikit-learn.

In various embodiments, both $l_1$ and $l_2$ regularization models fit a regularization hyperparameter using five folds for cross validation and searching across the seven parameters: [0, 0.001, 0.005, 0.01, 0.1, 0.5, 1]. In repeated iterations of model training, this range is restricted around previously successful settings.

In an embodiment, the tree-based model 418 is a random forests model. Random forests is a class of ensemble methods used for classification problems. Random forests models work by fitting an ensemble of decision tree classifiers on sub samples of the data. Each tree only sees a portion of the data, drawing samples of equal size with replacement. Each tree can use only a limited number of features. By averaging the output of classification across the ensemble, the random forests model can limit over-fitting that might otherwise occur in a decision tree model.

In an embodiment, the tree-based model 418 uses the random forests model in Python's scikit-learn. In an illustrative embodiment, the tree-based model 418 uses the following parameters in the scikit-learn random forests model:

Maximum tree depth: 3 or ∞, set with max_depth.
Maximum number of features considered when looking for the best split: 3→6, set with max_features.
Minimum number of samples required to split a node of the tree: 2→11, set with min_samples_split.
Minimum number of samples to be a leaf node: 1→11, set with min_samples_leaf.
Number of trees in the forest: 100 or 200, set by n_estimators.
Whether to sample with replacement for the data seen by each tree: true or false, set by bootstrap.
Function to measure quality of a split: Gini or Entropy (information gain), set as criterion.

In an embodiment, for each customer a pre-sale predictive model generates a value prediction signal indicative of potential value of a sales transaction for that customer. The predictive model can provide various types of value prediction signal including, for example: (a) buy-only signal, representative of the likelihood that the customer will accept the offer to purchase the product; (b) lapse-only signal representative of the likelihood that the customer will lapse in payments for the purchased product; (c) buy-don't-lapse signal representative of the likelihood that the customer will accept the offer to purchase the financial product and will not lapse in payments for the purchased product; as well as predictive models providing combinations of these signals.

Predictive models 410 effect a degree of feature selection. In various embodiments, predictive models 410 identify high importance features that have the most pronounced impact on predicted value. Different types of model may identify different features as most important. For example, a model based upon a buy-only signal may identify different leading features than a model based upon a lapse-only signal.

TABLE_1

Features from $l_1$ buy-don't-lapse model

| Importance | Feature |
|---|---|
| −2.7125 | expectant_parent_nominal |
| −0.3126 | recent_divorce_nominal_0 |
| −0.2634 | credit_card_new_issue_nominal_0 |
| −0.1438 | gender_input_individual_nominal_0 |
| 0.1117 | socially_influenced_ordinal |
| 0.0890 | home_length_of_residence_interval |
| −0.0757 | likely_investors_nominal_0 |
| −0.0667 | vacation_travel_international_would_enjoy_ordinal_to_binary |
| 0.0637 | total_liquid_investible_assets_fin_ordinal |
| −0.0632 | new_mover_nominal_0 |
| −0.0518 | single_parent_ordinal_to_binary |
| −0.0517 | vacation_travel_time_share_have_taken_ordinal_to_binary |
| −0.0455 | investments_real_estate_ordinal_to_binary |
| 0.0438 | investments_stocks_bonds_ordinal_to_binary |
| 0.0429 | obtain_life_insurance_along_with_loan_mortgage_installment_payments_ordinal |

Table 1 shows the top 15 features from an $l_1$ buy-don't-lapse model. The most important features are identified by the highest absolute value of the importance coefficient. The most important feature of this target is the expectant_parent_nominal variable, where a 0 corresponds to not expectant. Positive and negative signs of the importance coefficient indicate whether an increase, or a decrease, of the feature increases likelihood of the target. This data indicates that non-expectant parents are less likely to buy and less likely to lapse.

Figure 13:
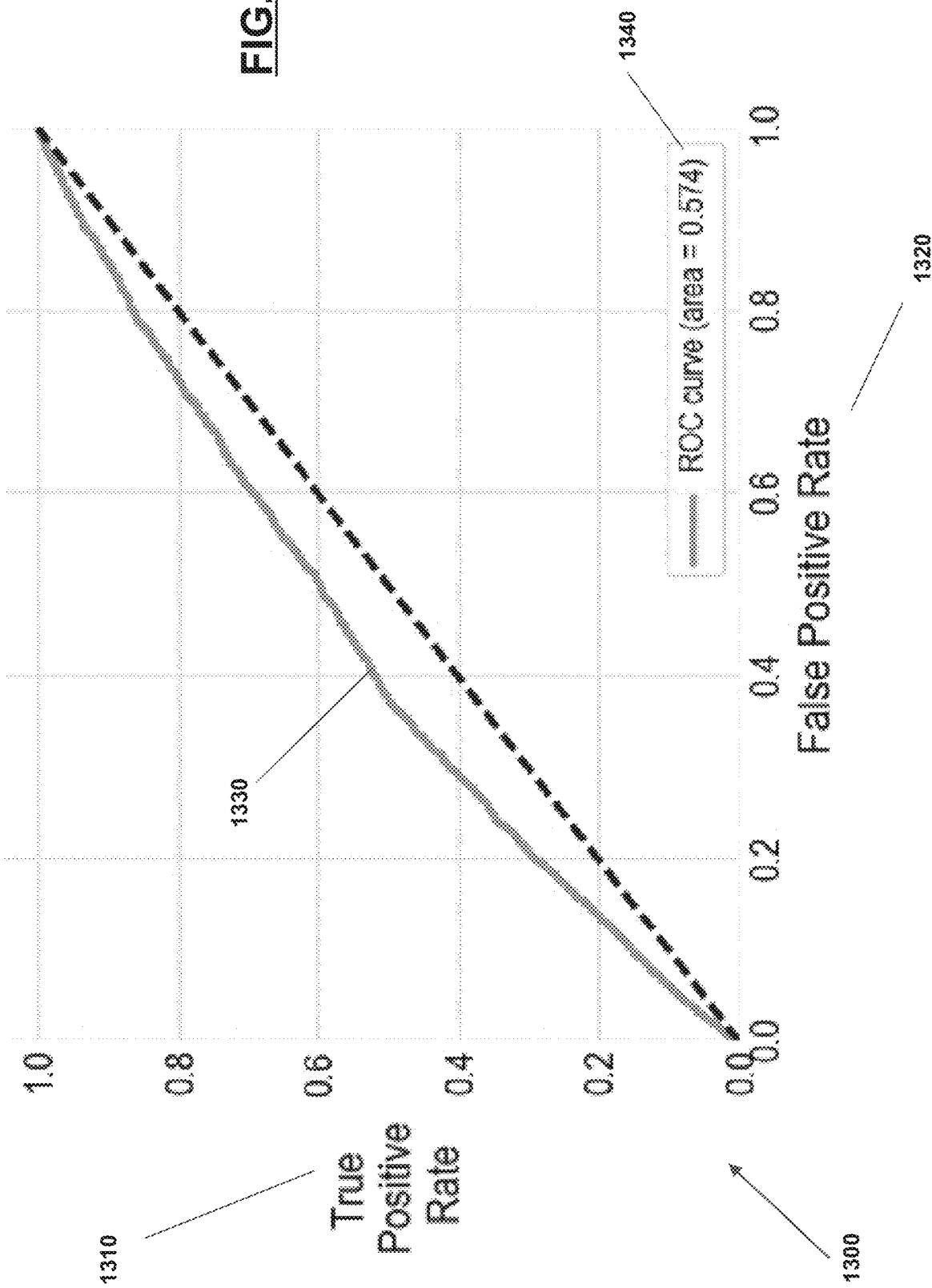
FIG. 13 is a graph of a receiver operator curve (ROC) for a value prediction model, in accordance with an embodiment.

In an embodiment, in building the predictive model 410, the call center evaluates performance of prospective models, such as test models, for efficacy in predicting buying behavior and/or lapse behavior. In an embodiment, prospective models are tested for the area under the curve (AUC) of a receiver-operator curve (ROC). FIG. 13 is an example 1300 of an ROC curve 1330. The receiver-operating characteristic (ROC) curve plots the true positive rate (Sensitivity) 1310 as a function of the false positive rate (100-Specificity) 1320 for different cut-off points. Each point on the ROC curve 1330 represents a sensitivity/specificity pair corresponding to a particular decision threshold. An ROC curve with a higher area under the curve (AUC) generally indicates a higher-performing model. The ROC 1300 of FIG. 13 was obtained in testing a logistic regression model with $l_1$ regularization on the lapse-only signal, and has an area under the curve (AUC) 1340 of 0.574, indicating a high-performing model.

Figure 14:
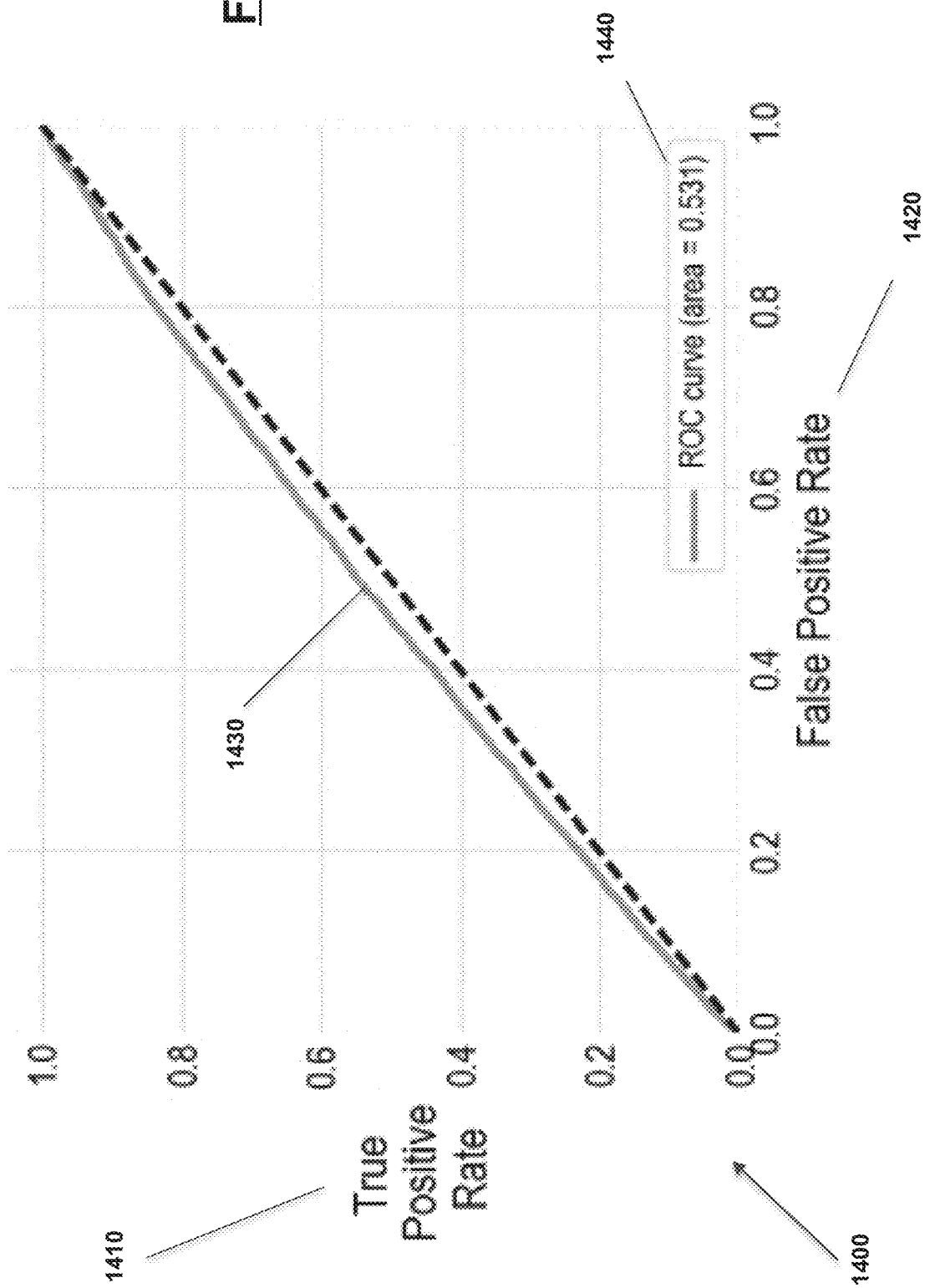
FIG. 14 is a graph of a receiver operator curve (ROC) for a value prediction model, in accordance with an embodiment.

FIG. 14 is another example of a receiver-operator curve (ROC) 1450, obtained by testing a logistic regression model with 12 regularization on the buy-only signal trained using all leads. (Sensitivity) 1460 as a function of the false positive rate (100-Specificity) 1470 for different cut-off points. Each point on the ROC curve 1480 represents a sensitivity/specificity pair corresponding to a particular decision threshold. ROC 1450 has an area under the curve (AUC) 1490 of 0.531.

Figure 15:
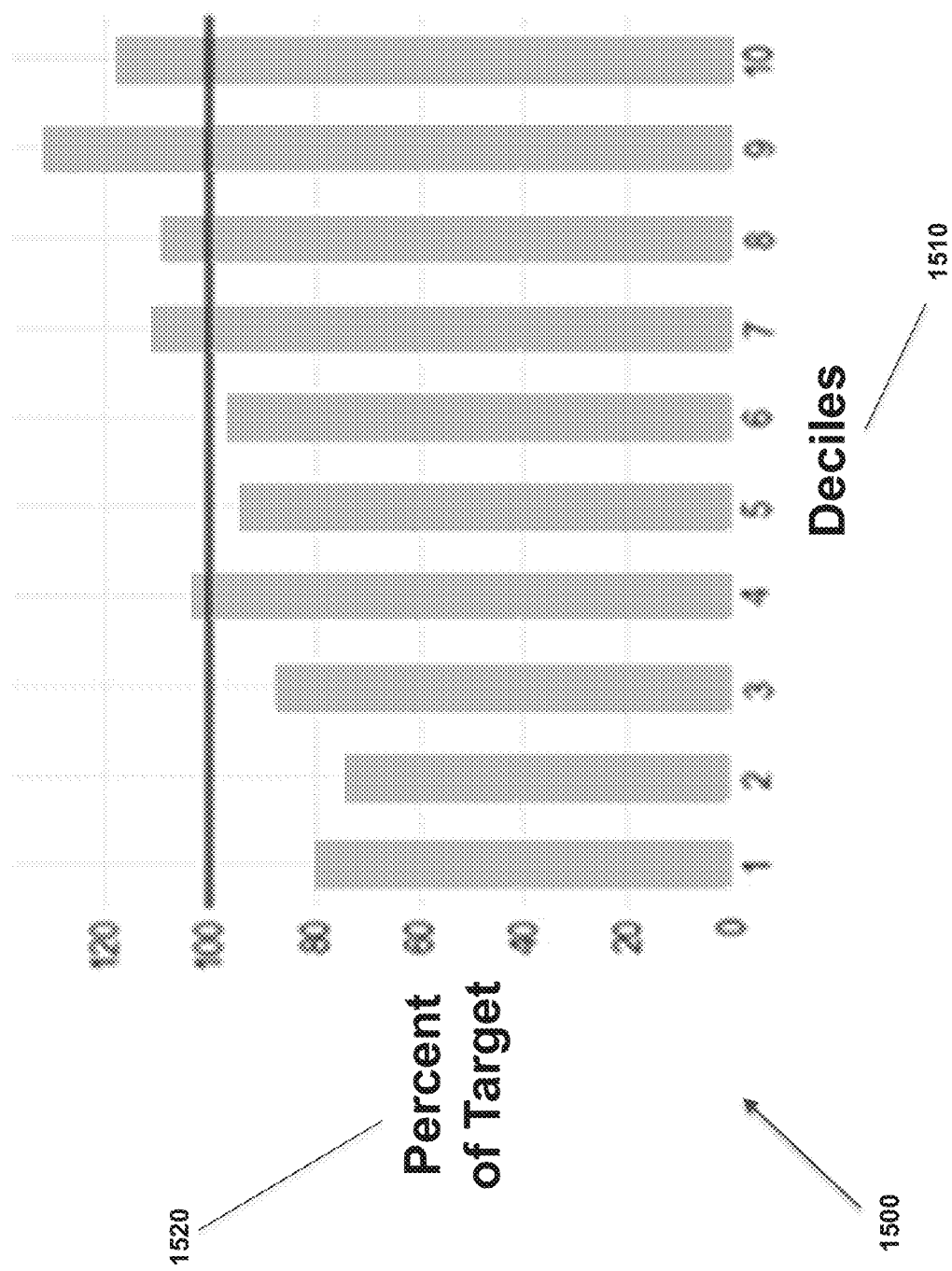
FIG. 15 is a graph of lift across deciles of model scores for a value prediction model, in accordance with an embodiment.

In an embodiment, prospective predictive models are tested for performance by measuring lift across deciles. Lift is a measure of the degree of improvement of a predictive model over analysis without a model. For a binary classifier model, decile lift is applied to deciles of the target records ranked by predicted probability. FIG. 15 is a graph of lift across deciles of model scores 1500 for a logistic regression model with $l_1$ regularization on the lapse-only signal, trained on zip-level features. Percent of target values 1520 across deciles 1510 show a significant impact of the model on lapse rate.

In an embodiment, prospective predictive models are tested for performance by measuring improvements in buying behavior and/or reductions on lapse rate. In various embodiments, these measurements are carried out with different levels of resource constraint of the call center, measured by call center agent resources in view of inbound call volume. For example, a 70% resource constraint involves agent resources at a 70% level of resources in view of call volume relative to full resources.

In illustrative embodiments, the predictive model incorporated a logistic regression model with $l_1$ regularization, for the lapse-only target. In one illustrative embodiment, this model was trained on all customers with individual-level data. In another illustrative embodiment, this model was trained on all customers with zip-level data. At a 70% resource constraint, the model with individual-level data was tested to provide an 11% reduction in lapse rate, while the model with zip-level data was tested to provide an 8% reduction in lapse rate. At a 60% resource constraint, the model with individual-level data was tested to provide a 14% reduction in lapse rate, while the model with zip-level data was tested to provide an 11% reduction in lapse rate.

While various aspects and embodiments have been disclosed, other aspects and embodiments are contemplated. The various aspects and embodiments disclosed are for purposes of illustration and are not intended to be limiting, with the true scope and spirit being indicated by the following claims.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

What is claimed is:

1. A method for managing customer calls within a call center, comprising:
   receiving, by a processor, a customer call at a call center from a customer;
   executing, by the processor, a predictive machine learning model configured to output a signal representative of likelihood of purchase of a product by inputting customer data retrieved using an identification of the customer; and
   routing, by the processor in accordance with the output signal, the customer call to an agent.

2. The method of claim 1, wherein the customer data comprises a previously purchased product.

3. The method of claim 1, further comprising:
transmitting, by the processor, to a device of the agent, information representative of at least one of the customer data or information representative of likelihood of purchase of the product.

4. The method of claim 1, further comprising:
transmitting, by the processor, to a device of the agent, information representative of customer service interactions with the customer relating to a previously purchased product.

5. The method of claim 1, wherein the customer data comprises customer demographic data.

6. The method of claim 1, further comprising:
generating, by the processor, a queue of customer call, wherein each customer call has a position within the queue in accordance with its respective likelihood of purchase of the product.

7. The method of claim 1, wherein the predictive machine learning model is configured to predict a second signal corresponding to a likelihood of the customer accepting an offer to purchase the product or a second product.

8. A system comprising:
a server comprising a processor and a non-transitory computer-readable medium containing instructions that when executed by the processor causes the processor to:
receive a customer call at a call center from a customer;
execute a predictive machine learning model configured to output a signal representative of likelihood of purchase of a product by inputting customer data retrieved using an identification of the customer; and
route, in accordance with the output signal, the customer call to an agent.

9. The system of claim 8, wherein the customer data comprises a previously purchased product.

10. The system of claim 8, wherein the instructions are further configured to cause the processor to:
transmit to a device of the agent, information representative of at least one of the customer data or information representative of likelihood of purchase of the product.

11. The system of claim 8, wherein the instructions are further configured to cause the processor to:
transmit to a device of the agent, information representative of customer service interactions with the customer relating to a previously purchased product.

12. The system of claim 8, wherein the customer data comprises customer demographic data.

13. The system of claim 8, wherein the instructions are further configured to cause the processor to:
generate a queue of customer call, wherein each customer call has a position within the queue in accordance with its respective likelihood of purchase of the product.

14. The system of claim 8, wherein the predictive machine learning model is configured to predict a second signal corresponding to a likelihood of the customer accepting an offer to purchase the product or a second product.

15. A system comprising:
a database; and
a computer configured to execute a predictive machine learning model, wherein the computer is communication with the database, the computer further configured to:
receive a customer call at a call center from a customer;
execute the predictive machine learning model configured to output a signal representative of likelihood of purchase of a product by inputting customer data retrieved from the database using an identification of the customer; and
route, in accordance with the output signal, the customer call to an agent.

16. The system of claim 15, wherein the customer data comprises a previously purchased product.

17. The system of claim 15, wherein the computer is further configured to:
transmit to a device of the agent, information representative of at least one of the customer data or information representative of likelihood of purchase of the product.

18. The system of claim 15, wherein the computer is further configured to:
transmit to a device of the agent, information representative of customer service interactions with the customer relating to the previously purchased product.

19. The system of claim 15, wherein the customer data comprises customer demographic data.

20. The system of claim 15, wherein the computer is further configured to:
generate a queue of customer call, wherein each customer call has a position within the queue in accordance with its respective likelihood of purchase of the product.

* * * * *